United States Patent [19]

Mizuno

[11] 4,344,086
[45] Aug. 10, 1982

[54] ENCODER FOR ENCODING A MULTILEVEL PEL SIGNAL SEQUENCE WITH PROBABILITY REPRESENTATIVE MODE CODES ALLOTTED TO PREDICTION ERROR CODES FOR EACH PEL SIGNAL AND A DECODER THEREFOR

[75] Inventor: Shoji Mizuno, Tokyo, Japan

[73] Assignee: Nippon Electric Co., Ltd., Tokyo, Japan

[21] Appl. No.: 207,500

[22] Filed: Nov. 17, 1980

[30] Foreign Application Priority Data

| Nov. 20, 1979 | [JP] | Japan | 54-150349 |
| Apr. 4, 1980 | [JP] | Japan | 55-44306 |
| Apr. 4, 1980 | [JP] | Japan | 55-44307 |
| Apr. 9, 1980 | [JP] | Japan | 55-46673 |
| Apr. 9, 1980 | [JP] | Japan | 55-46674 |

[51] Int. Cl.$^3$ ............... H04N 1/40; H04N 7/12
[52] U.S. Cl. .................... 358/78; 358/75; 358/261
[58] Field of Search ............ 358/78, 75, 261, 260

[56] References Cited

U.S. PATENT DOCUMENTS

| 4,035,837 | 7/1977 | Starck | 358/78 |
| 4,215,375 | 7/1980 | Usubuchi | 358/261 |
| 4,259,693 | 3/1981 | Aaron | 358/261 |
| 4,270,141 | 5/1981 | Sakamoto | 358/78 |

Primary Examiner—Howard Britton
Attorney, Agent, or Firm—Sughrue, Mion, Zinn, Macpeak & Seas

[57] ABSTRACT

For each pel signal capable of taking each of a plurality of levels with a first probability dependent on a reference signal, binary prediction error codes are produced to represent one of serial numbers assigned to the first probabilities arranged in a monotonously decreasing order that is coincident with the actually taken level. Mode codes are allotted to the respective prediction error codes with each mode code made to represent a second probability that the prediction error code allotted therewith is binary zero. The prediction error codes for a sequence of pel signals are grouped according to the mode codes allotted thereto and then compression encoded. Preferably, the mode codes are produced in consideration of the prediction error code or codes of more significant binary bit. A compression encoded signal is expansion decoded by alternatingly reproducing the mode codes and the prediction error codes. Reproductions of the prediction error codes provide reproduced pel signals. When the pel signal is variable among a great number of levels, the pel signal is preferably represented by a combination of one each of a plurality of partial pel signals, each representative of a smaller number of levels.

14 Claims, 28 Drawing Figures

FIG. 1
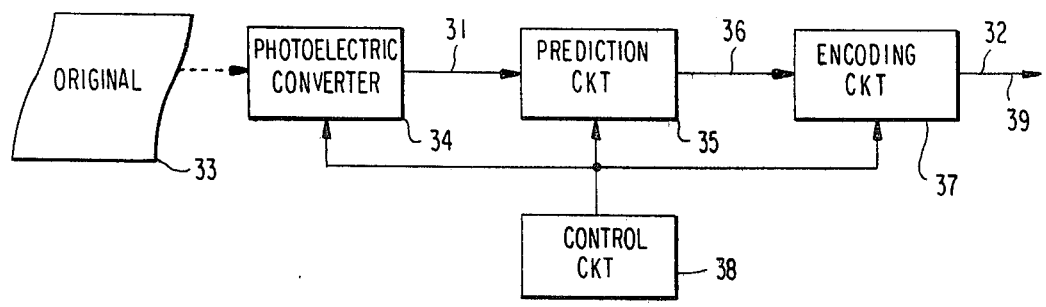
FIG. 2
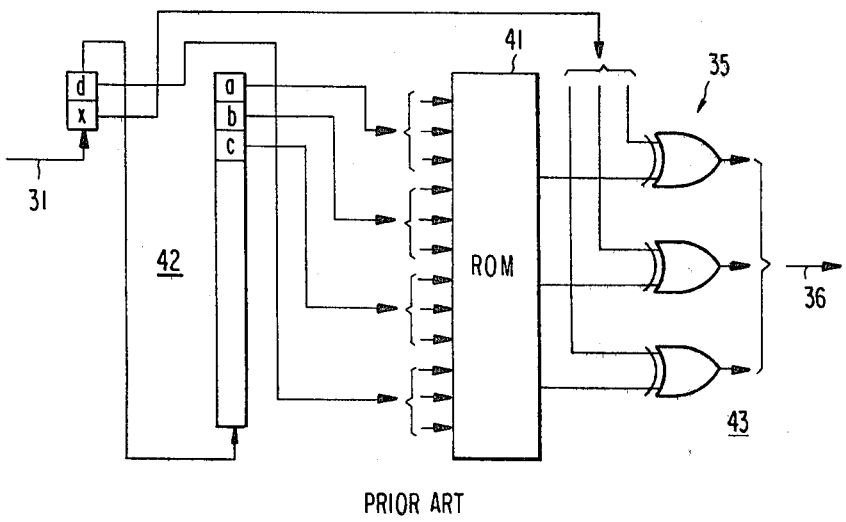
PRIOR ART
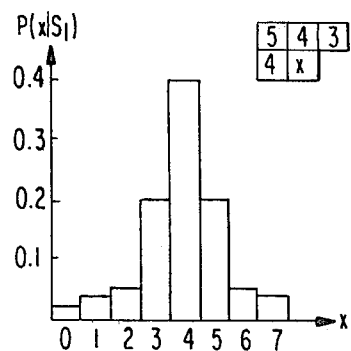
(a)
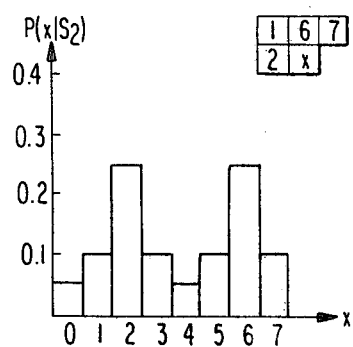
(b)
FIG. 3

FIG 22a

| y | y1 | y2 | | | | y3 | | | | | | | | | | | | | | |
|---|---|---|---|---|---|---|---|---|---|---|---|---|---|---|---|---|---|---|---|---|
| | | x1=0 | x1=1 | x1=2 | x1=3 | x1=0 | | | | x1=1 | | | | x1=2 | | | | x1=3 | | |
| | | | | | | x2=0 | x2=1 | x2=2 | x2=3 | x2=0 | x2=1 | x2=2 | x2=3 | x2=0 | x2=1 | x2=2 | x2=3 | x2=0 | x2=1 | x2=2 | x2=3 |
| 0 | 0 | 0 | 0 | 0 | 0 | 0,1,2,3 | 0 | 0 | 0 | 0 | 0 | 0 | 0 | 0 | 0 | 0 | 0 | 0 | 0 | 0 | 0 |
| 1 | | | | | | | | | | | | | | | | | | | | | |
| 2 | | | | | | | | | | | | | | | | | | | | | |
| 3 | | | | | | | | | | | | | | | | | | | | | |
| 4 | | 1 | 0 | 0 | 0 | 3 | 0,1,2,3 | 0 | 0 | 0 | 0 | 0 | 0 | 0 | 0 | 0 | 0 | 0 | 0 | 0 | 0 |
| 5 | | | | | | | | | | | | | | | | | | | | | |
| 6 | | | | | | | | | | | | | | | | | | | | | |
| 7 | | | | | | | | | | | | | | | | | | | | | |
| 8 | | 2 | 0 | 0 | 0 | 3 | 3 | 0,1,2,3 | 0 | 0 | 0 | 0 | 0 | 0 | 0 | 0 | 0 | 0 | 0 | 0 | 0 |
| 9 | | | | | | | | | | | | | | | | | | | | | |
| 10 | | | | | | | | | | | | | | | | | | | | | |
| 11 | | | | | | | | | | | | | | | | | | | | | |
| 12 | | 3 | 0 | 0 | 0 | 3 | 3 | 3 | 0,1,2,3 | 0 | 0 | 0 | 0 | 0 | 0 | 0 | 0 | 0 | 0 | 0 | 0 |
| 13 | | | | | | | | | | | | | | | | | | | | | |
| 14 | | | | | | | | | | | | | | | | | | | | | |
| 15 | | | | | | | | | | | | | | | | | | | | | |
| 16 | 1 | 3 | 0 | 0 | 0 | 3 | 3 | 3 | 3 | 0,1,2,3 | 0 | 0 | 0 | 0 | 0 | 0 | 0 | 0 | 0 | 0 | 0 |
| 17 | | | | | | | | | | | | | | | | | | | | | |
| 18 | | | | | | | | | | | | | | | | | | | | | |
| 19 | | | | | | | | | | | | | | | | | | | | | |
| ... | | | | | | | | | | | | | | | | | | | | | |
| 28 | | 3 | 3 | 0 | 0 | 3 | 3 | 3 | 3 | 3 | 3 | 3 | 0,1,2 | 0 | 0 | 0 | 0 | 0 | 0 | 0 | 0 |
| 29 | | | | | | | | | | | | | | | | | | | | | |
| 30 | | | | | | | | | | | | | | | | | | | | | |

FIG. 22b

| | 31 | 32 | 33 | 34 | 35 | 36 | 37 | 38 | 39 | 40 | 41 | 42 | 43 | 44 | 45 | 46 | 47 | 48 | 49 | 50 | 51 | ... | 60 | 61 | 62 | 63 |
|---|---|---|---|---|---|---|---|---|---|---|---|---|---|---|---|---|---|---|---|---|---|---|---|---|---|---|
| | | | | | | | | | | | | 2 | | | | | | | | | 3 | | | | | |
| 186 | 3 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 3 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
| 187 | 3 | 0 | 1 | 2 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 0 | 0 | 0 | 0 | 0 | 3 | 3 | 3 | 3 | 3 | 3 | 3 | 3 | 3 | 3 | 3 | 3 | 3 | 3 | 3 | 3 | | 3 | 3 | 3 | 3 |
| 188 | 3 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 3 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 3 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 3 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 3 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 3 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 3 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 3 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 0 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 1 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 2 | 3 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  | 3 | 0 | 3 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  |   | 0 | 0 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  |   | 0 | 1 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  |   | 0 | 2 | 3 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  |   | 0 | 3 | 0 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  |   |   | 0 | 0 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  |   |   | 0 | 1 | 3 | 3 | 3 | 3 | 3 | 3 | 3 | 3 | 3 | 3 | 3 | 3 | 3 | 3 | 3 | 3 | 3 | | 3 | 3 | 3 | 3 |
|  |   |   | 0 | 2 | 0 | 3 | 3 | 3 | 3 | 3 | 3 | 3 | 3 | 3 | 3 | 3 | 3 | 3 | 3 | 3 | 3 | | 3 | 3 | 3 | 3 |
|  |   |   | 0 | 3 | 0 | 3 | 3 | 3 | 3 | 3 | 3 | 3 | 3 | 3 | 3 | 3 | 3 | 3 | 3 | 3 | 3 | | 0 | 3 | 3 | 3 |
|  |   |   |   | 0 | 0 | 0 | 3 | 3 | 3 | 3 | 3 | 3 | 3 | 3 | 3 | 3 | 3 | 3 | 3 | 3 | 3 | | 1 | 3 | 3 | 3 |
|  |   |   |   | 0 | 0 | 0 | 3 | 3 | 3 | 3 | 3 | 3 | 3 | 3 | 3 | 3 | 3 | 3 | 3 | 3 | 3 | | 2 | 3 | 3 | 3 |
|  |   |   |   | 0 | 0 | 0 | 3 | 3 | 3 | 3 | 3 | 3 | 3 | 3 | 3 | 3 | 3 | 3 | 3 | 3 | 3 | | 3 | 3 | 3 | 3 |

ENCODER FOR ENCODING A MULTILEVEL PEL SIGNAL SEQUENCE WITH PROBABILITY REPRESENTATIVE MODE CODES ALLOTTED TO PREDICTION ERROR CODES FOR EACH PEL SIGNAL AND A DECODER THEREFOR

BACKGROUND OF THE INVENTION

This invention relates to an encoder for encoding a multilevel or multiple-level picture element (usually abbreviated to "pel") signal sequence into a compression encoded signal, a decoder therefor, and an encoder-decoder system comprising such an encoder and a decoder.

An encoder of the above-specified type remarkably reduces the amount of information or data to be either transmitted or stored. It is thereby possible to raise the speed of transmission and to reduce the memory capacity of a memory in which the multilevel picture element signal sequence is to be stored.

Predictive encoding is effective in carrying out the data compression encoding. According to the predictive encoding technique, an actual level of each picture element signal in a multilevel picture element signal sequence is predicted by the use of a predetermined number of picture element signals neighboring the picture element signal under consideration among the picture element signals preceding that picture element signal in the sequence. Encoding is carried out for a sequence of error signals, each representative of the difference between the actual level and the predicted level of the picture element signal in question. The accuracy of prediction is rendered high to raise the data compression efficiency when nonlinear prediction is resorted to. A large capacity memory is, however, indispensable in producing the error signals as will later be discussed particularly when the multilevel picture element signal sequence is variable among a great number of levels. Therefore, the encoder becomes accordingly bulky. This applies to a color picture element signal sequence in which the difference among colors is represented by a great number of levels.

In facsimile transmission of a two-level picture element signal sequence, one-dimensional run length encoding is widely resorted to. The above-described error signals are, however, not conveniently encoded by the run length encoding technique as will soon be described with reference to a few of about twenty figures of the accompanying drawing when the number of levels is more than two.

Furthermore, a known mode run length encoding technique applied to a color picture element signal sequence is not effective in carrying out the data compression. According to the technique, a duration of a particular color during a certain time interval is considered as a run of a run length corresponding to the duration. A run length code is generated to represent the run length, together with a mode code that specifies the particular color. The frequency of appearance of a specific color is taken into consideration on deciding the run length codes and the mode codes. The correlation between colors is, however, entirely neglected. For example, the run length codes and the mode codes are predetermined without any consideration on the fact that either orange or green appears more frequently than other colors, the next most frequent color being yellow.

Accordingly, a large capacity memory becomes indispensable in expansion decoding the compression encoded signal derived by nonlinear prediction from a multilevel picture element signal sequence variable among many levels. This applies to both a monochromatic and a color picture element signal sequence.

SUMMARY OF THE INVENTION

It is therefore an object of the present invention to provide an encoder for encoding a multilevel picture element signal sequence into a compression encoded signal by the use of a sequence of error signals which are produced according to the nonlinear prediction technique and yet can effectively be encoded according to the run length encoding technique without any change in the structure of a transmitter for the run length encoded signal.

It is another object of this invention to provide a decoder for expansion decoding the compression encoded signal into which a multilevel picture element signal sequence is encoded by an encoder of the type described.

It is still another object of this invention to provide an encoder-decoder system comprising an encoder and a decoder of the type described.

It is yet another object of this invention to provide an encoder, a decoder, on an encoder-decoder system of the type described, for which the multilevel picture element signal sequence is specifically a color picture element signal sequence.

It is a further object of this invention to provide an encoder of the type described, in which nonlinear prediction is carried out by the use of a memory of a small memory capacity even when the multilevel picture element signal sequence is variable among a great number of levels.

It is a still further object of this invention to provide a decoder of the type described, which comprises a small capacity memory for expansion decoding the compression encoded signal into which a multilevel picture element signal sequence variable among a great number of levels is compression encoded by an encoder of the type described.

It is a yet further object of this invention to provide an encoder-decoder system comprising an encoder and a decoder, each of which comprises a small capacity memory as described hereinabove.

According to this invention, there is provided a multilevel picture element signal encoder-decoder system comprising an encoder and a decoder. The encoder is for encoding a sequence of original picture element signals into a compression encoded signal. Each picture element signal x is capable of taking each of a plurality of levels, more than two in number, with a first probability dependent on an original reference signal S consisting of those of the picture element signals in the sequence which precede the picture element signal x under consideration in a predetermined relationship with respect to that picture element signal x. The levels are assigned with serial numbers, respectively, according to the respective first probabilities. The encoder comprises prediction error code producing means responsive to the reference signal S and the picture element signal x in question for producing a predetermined number of prediction error codes which are so dependent on the serial number assigned to the level actually taken by that picture element signal x as to represent a prediction error, mode code producing means responsive to the reference signal S and the prediction error codes for producing a plurality of mode codes allotted to the respective prediction error codes with each mode code made to represent a second probability that the prediction error code allotted therewith represents zero, grouping means for grouping the prediction error codes produced for the picture element signals in the sequence in accordance with the mode codes allotted thereto, and compression encoding means for compression encoding the grouped prediction error codes into the compression encoded signal. The decoder is for expansion decoding the compression encoded signal into a sequence of reproduced picture element signals by reproducing the mode codes for each reproduced picture element signal in response to a reproduced reference signal consisting of those of the reproduced picture element signals in the reproduced picture element signal sequence, which precede the reproduced picture element signal is question in the predetermined relationship with respect to that reproduced picture element signal, and in response to those reproductions of the prediction error codes into which the compression encoded signal is expansion decoded as regards the reproduced picture element signal under consideration with reference to the reproduced mode codes.

According to this invention, there is also provided an encoder for encoding a sequence of N-level picture element signals into a compression encoded signal, where N represents an integer greater than $2^{n-1}$ and not greater than $2^n$ and where n represents a natural number greater than unity. Each picture element signal x is capable of taking each of N levels with a first probability dependent on a reference signal S consisting of those of the picture element signals in the sequence which precede the picture element signal x under consideration in a predetermined relationship with respect to that picture element signal x. The picture element signal x in question actually takes one of the N levels. The encoder comprises prediction error code producing means, mode code producing means, grouping means, and compression encoding means. The prediction error code producing means is responsive to the reference signal S and the picture element signal x under consideration for producing a predetermined number of prediction error codes $e_i$'s, I in number, where I represents an integer equal at most to the natural number n and where i represents each of 1 through I. An i-th prediction error code $e_i$ takes either a binary "0" and "1" levels so that a binary number e represented by the prediction error codes $e_i$'s is equal to that one of N serial numbers increasing consecutively from zero and assigned to the respective first probabilities arranged in a monotonously decreasing order which is assigned to the first probability for that one level. The mode code producing means is responsive to the reference signal S and the prediction error codes $e_i$'s for producing a plurality of mode codes $M_i$'s allotted to the respective prediction error codes $e_i$'s. An i-th mode code $M_i$ takes either of the binary "0" and "1" levels depending on a second probability that the i-th prediction error code $e_i$ has the binary "0" level. The grouping means is for grouping the prediction error codes produced for the picture element signals in the sequence in accordance with the mode codes allotted thereto. The compression encoding means is for compression encoding the grouped prediction error codes into the compression encoded signal.

According to this invention, there is furthermore provided a decoder for decoding a compression encoded signal into a sequence of N-level reproduced picture element signals, where N represents an integer greater than $2^{n-1}$ and not greater than $2^n$ and where n represents a natural number greater than unity. Each picture element signal x is capable of taking each of N levels with a first probability dependent on a reproduced reference signal S consisting of those of the picture element signals in the sequence which precede the picture element signal x under consideration in a predetermined relationship with respect to that picture element signal x. The picture element signal x in question actually takes one of the N levels. The compression encoded signal is derived from a sequence of original picture element signals among which each original picture element signal is capable of taking each of the N levels with the first probability determined by an original reference signal consisting of those of the original picture element signals in the original picture element signal sequence which precede the original picture element signal under consideration in the predetermined relationship with respect to that original picture element signal. The compression encoded signal is derived by producing in response to the original reference signal and the above-mentioned each original picture element signal first through I-th original prediction error codes representative of the most significant through the least significant bits of a binary number equal to that one of N serial numbers increasing from zero and assigned to the respective first probabilities arranged in a monotonously decreasing order which is assigned to the level actually taken by the original picture element signal in question, where I represents an integer equal at most to the natural number n, by allotting I mode codes to the respective prediction error codes with an i-th mode code given either of binary "0" and "1" levels depending on a second probability determined by the original reference signal and a predetermined number of the prediction error codes, (i-1) in number, where i represents each of 1 through I, with the predetermined number of prediction error codes selected from the first prediction error code $e_1$ towards the (I-1)-th prediction error code $e_{I-1}$, by grouping the prediction error codes produced for the original picture element signals in the original picture element signal sequence in accordance with the mode codes allotted thereto, and by compression encoding the grouped prediction error codes into the compression encoded signal. The reproduced picture element signals are in one-to-one correspondence to the original picture element signals. The reproduced picture element signal x in question is given by first through I-th reproduced prediction error codes $e_i$'s equal to the respective original prediction error codes produced for the corresponding original picture element signal. The decoder comprises first means responsive to the reproduced reference signal S for reproducing the first mode code $M_1$ to be allotted to the first reproduced prediction error code $e_1$, second means responsive to the compression encoded signal and the reproduced first mode code $M_1$ for producing the first reproduced prediction error code $e_1$, and third means responsive to the compression encoded signal, the reproduced reference signal S, the reproduced first mode code $M_1$, and the first reproduced prediction error code $e_1$ for reproducing the mode codes $M_i$'s other than the first mode code $M_1$ and for producing the reproduced prediction error codes $e_i$'s other than the first reproduced error code $e_1$.

BRIEF DESCRIPTION OF THE DRAWING

FIG. 1 is a block diagram of an encoder for use in an encoder-decoder system according to a first embodiment of the instant invention in encoding a multilevel picture element signal sequence into a compression encoded signal;

FIG. 2 is a block diagram of a conventional prediction circuit for use in an encoder of the type shown in FIG. 1;

FIGS. 3(a) and 3(b) show levels of a multilevel picture element signal for two typical combinations of the levels taken by four neighboring ones of the picture element signals preceding in the sequence the picture element signal under consideration and the probability that each level is taken by the picture element signal in question;

FIG. 18, is a block diagram of a portion of a run length encoding circuit of the type shown in FIG. 9;

FIGS. 22 (a) and 22 (b) shows, when FIG. 22 (b) is connected below FIG. 22 (a), a table for dealing with a picture element signal variable among sixty-four levels.

DESCRIPTION OF THE PREFERRED EMBODIMENTS

Figure 5:
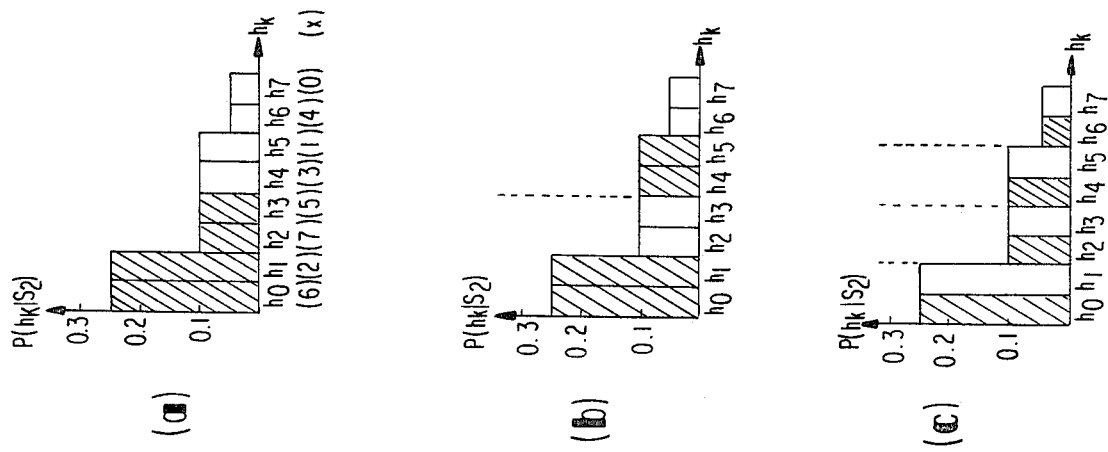
FIGS. 5(a), 5(b), and 5(c) are similar to FIG. 3(b) except that the levels are rearranged in the order in which their respective probabilities monotonously decrease.

Referring to FIG. 1, it will be assumed that an encoder for use according to a first embodiment of the present invention in an encoder-decoder system in encoding a multilevel picture element signal sequence 31 into a compression encoded signal 32, is applied to a facsimile transmitter for transmitting an original document or copy 33 that is fed relative to the encoder and has a certain width transversely of the direction of feed. An original pattern or picture, which may be a sequence of printed letters, is present on the document 33. Although the original pattern may be colored as will later be described, it will be assumed for the time being that the original pattern is given by various shades of a single color, which may be an achromatic color, such as black or white.

The document 33 is either electrically or mechanically scanned (generally scanned) by a known photoelectric converter 34 of the encoder. It is presumed without loss of generality that the document 33 is fed from bottom to top and scanned from left to right in the figure. The document 33 is thereby covered by a raster of successive scanning lines. As a result of the relative feed and scan, the original pattern and the background are sampled into samples or picture elements represented by picture element signals of the multilevel picture element signal sequence 31, which may be called a video signal. In the raster, picture elements of the successive scanning lines are usually arranged along straight lines which cross the respective scanning lines substantially perpendicular.

When the number of levels is denoted by N, each picture element signal takes one of the N levels and is given by an n-bit binary signal, where n represents a natural number such that the number of levels N is equal to or less than $2^n$ and is greater than $2^{n-1}$. Merely for clarity of most of the description that follows, let the multilevel picture element signal sequence 31 be an eight-level picture element signal sequence that is variable among levels 0 through 7 depending on the shades of the successive picture elements. In other words, each picture element signal actually takes one of the eight levels and is given by a pertinent one of three-bit binary signals (000), (001), (010), ..., and (111), among which the first bit represents the most significant bit and the third bit, the least significant bit. The binary "0" and "1" levels may be a low and a high level, respectively.

Responsive to the multilevel picture element signal sequence 31, a prediction circuit 35 produces a sequence of prediction error signals 36 as will presently be described more in detail. Responsive to the prediction error signal sequence 36, an encoding circuit 37 produces the compression encoded signal 32 as will also be detailed in the following. A control circuit 38 is for supplying the converter 34, the prediction circuit 35, and the encoding circuit 37 with various control signals and synchronizing signals. For example, the control circuit 38 supplies the prediction circuit 35 with a sequence of timing pulses so as to enable the latter to produce the picture element signal sequence 31 in synchronism therewith. The compression encoded signal 32 is delivered to a data link 39, which comprises a facsimile transmitter.

Turning to FIG. 2, a conventional prediction circuit is for converting the eight-level picture element signal sequence 31 to the prediction error signal sequence 36.

Let a particular picture element signal x to be subjected to prediction actually take an actual level x (the same reference letter being used merely for simplicity of denotation). The actual level x is predicted as a predicted level $\hat{x}$ with reference to a predetermined number of picture element signals neighboring the particular picture element signal x and preceding the particular picture element signal x in the sequence 31. More generally, the picture element signals used in predicting the predicted level $\hat{x}$ are those of the picture element signals in the sequence 31 which precede the particular picture element signal x in a predetermined relationship with respect to the particular picture element signal x and are herein collectively referred to as a reference signal S. Each prediction error signal g of the sequence 36 represents the difference obtained by subtracting the predicted level x from the actual level x and is therefore given again by a three-bit binary signal. It will now be presumed without loss of generality that the reference signal S consists of four picture element signals, among which three a, b, and c are placed consecutively along a previous scanning line next previous to a present scanning line for the particular picture element x (the same reference letter being again used) with the center picture element b placed in substantial alignment with the particular picture element x and one d, next preceding the particular picture element x in the present scanning line.

According to linear prediction, the predicted level $\hat{x}$ is given by:

$$\hat{x} = C_1 a + C_2 b + C_3 c + C_4 d,$$

where a through d are representative of the levels of the picture element signals a through d of the reference signal S and $C_1$ through $C_4$, coefficients indicative of the degree of correlation between the actual level x and the respective levels a through d.

In order to more precisely predict the predicted level $\hat{x}$, it is preferred to resort to nonlinear prediction. For this purpose, an ROM (read-only memory) 41 is accessed by the reference signal S and produces a predicted signal $\hat{x}$ having the predicted level $\hat{x}$ from the accessed address. The predicted signal $\hat{x}$ may be predetermined for each combination of the picture element signals a through d in the reference signal S and preliminarily written in the ROM 41 at the address accessible by the picture element signal levels a through d.

The reference signal S is supplied to the ROM 41 through a shift register 42 having (R+2) stages, where R represents the number of picture elements in each scanning line and is predetermined in consideration of the width of the document 33 and the speed of scan. Each stage is for a three-bit binary signal. The shift register 42 is therefore a 3(R+2)-bit shift register. A sequence of shift pulses for the shift register 42 is supplied from the control circuit 38 in synchronism with the above-mentioned timing pulses. Only five of the shift register stages are depicted in the above-described configuration of the picture elements x and a through d in the raster merely for clarity of illustration.

Instead of providing the prediction error signal g with the level representative of the above-described difference in which case a sign bit for the difference is indispensable, the prediction circuit comprises first through third Exclusive OR gates, collectively indicated at 43, responsive to the particular picture element signal x and the predicted signal $\hat{x}$ for producing first through third bits $g_i$'s or $g_1$ through $g_3$ of the prediction error signal g.

The encoding circuit 37 illustrated with reference to FIG. 1 may be a one-dimensional run length encoder widely used in encoding in a facsimile transmitter a white and a black run length of a two-level facsimile signal into a white and a black run length code, respectively. When applied to encoding of the prediction error signal sequence 36, the run length encoder encodes the true and the false run lengths during which the prediction is true and false, respectively, as will presently be described in detail. Use of such a run length encoder is advantageous because a conventional two-level facsimile transmitter is readily used as a facsimile transmitter for the multilevel picture element signal sequence 31 by substituting the prediction circuit illustrated with reference to FIG. 2 for a conventional prediction circuit for the two-level facsimile signal. The run length encoder carries out effective data compression if the binary "0" level always appears more frequently than the binary "1" level in the prediction error signal sequence 36. It is, however, not always the case as will be described below when the conventional prediction circuit illustrated with reference to FIG. 2 is resorted to.

Referring to FIGS. 3 (a) and 3 (b), let the cases of the reference signal S be considered in which the picture element signals a through d have the levels 5, 4, 3, and 4 in a first reference signal $S_1$ and the levels 1, 6, 7 and 2 in a second reference signal $S_2$. In either case, the actual level x of the particular picture element signal x may be any one of the levels 0 through 7. The probability, herein called a first probability, that the particular picture element signal x has a certain actual level x under the condition such that the reference signal S is a j-th reference signal $S_j$, will be denoted by $P(x|S_j)$. The probability for each of the levels 0 through 7 and for various combinations of the reference signal levels a through d are already known for various numbers of the picture element signals, such as a through d, in each reference signal $S_j$. The probabilities $P(x|S_1)$ for the first reference signal $S_1$ is shown in FIG. 3 (a) and listed in the upper part of Table 1. When the distribution of probability thus has only one peak, it is adequate to use the peak level, now the level 4, as the predicted level $\hat{x}$. The probability $P(x|S_2)$ for the second reference signal $S_2$ is depicted in FIG. 3 (b) and given in the upper part of Table 2. When the probability distribution thus has two peaks, it is impossible to uniquely decide the predicted level $\hat{x}$. Merely for convenience, it may be possible to give the predicted level $\hat{x}$ by the mean level 4 of the levels 2 and 6 at which the peaks appear. The prediction error signal bits $g_i$'s for the respective reference signals $S_1$ and $S_2$ are listed in the lower parts of Tables 1 and 2.

TABLE 1

| x | 0 | 1 | 2 | 3 | 4 | 5 | 6 | 7 |
|---|---|---|---|---|---|---|---|---|
| $\hat{x}$ | 4 | 4 | 4 | 4 | 4 | 4 | 4 | 4 |
| $P(x\|S_1)$ | 0.02 | 0.04 | 0.05 | 0.20 | 0.40 | 0.20 | 0.05 | 0.04 |
| $g_1$ | 1 | 1 | 1 | 1 | 1 | 1 | 1 | 1 |
| $g_2$ | 0 | 0 | 1 | 1 | 0 | 0 | 1 | 1 |
| $g_3$ | 0 | 1 | 0 | 1 | 0 | 1 | 0 | 1 |

TABLE 2

| x | 0 | 1 | 2 | 3 | 4 | 5 | 6 | 7 |
|---|---|---|---|---|---|---|---|---|
| $\hat{x}$ | 4 | 4 | 4 | 4 | 4 | 4 | 4 | 4 |
| $P(x\|S_2)$ | 0.05 | 0.10 | 0.25 | 0.10 | 0.05 | 0.10 | 0.25 | 0.10 |

TABLE 2-continued

| | | | | | | | | |
|---|---|---|---|---|---|---|---|---|
| $g_1$ | 1 | 1 | 1 | 1 | 0 | 0 | 0 | 0 |
| $g_2$ | 0 | 0 | 1 | 1 | 0 | 0 | 1 | 1 |
| $g_3$ | 0 | 1 | 0 | 1 | 0 | 1 | 0 | 1 |

The probability that the i-th prediction error signal bit $g_i$ has the binary "0" level for a certain reference signal $S_j$ will be designated by $P(g_i=0|S_j)$. By way of example, the probability $P(g_1=0|S_2)$ is given by a sum of the probabilities given in Table 2 for $g_i=0$. Namely:

$$P(g_1=0|S_2) = 0.05 + 0.10 + 0.25 + 0.10 = 0.50.$$

The probability that the i-th bit $g_i$ has the binary "1" level is denoted by the $P(g_i=1|S_j)$ and is calculated according to:

$$P(g_i=1|S_j) = 1 - P(g_i=0|S_j).$$

Such probabilities are given in Table 3 for the first reference signal $S_1$ and in Table 4 for the second reference signal $S_2$.

TABLE 3

| | $P(g_1|S_1)$ | $P(g_2|S_1)$ | $P(g_3|S_1)$ |
|---|---|---|---|
| $g_1 = 0$ | 0.69 | 0.66 | 0.52 |
| $g_1 = 1$ | 0.31 | 0.34 | 0.48 |

TABLE 4

| | $P(g_1|S_2)$ | $P(g_2|S_2)$ | $P(g_3|S_2)$ |
|---|---|---|---|
| $g_i = 0$ | 0.50 | 0.30 | 0.50 |
| $g_i = 1$ | 0.50 | 0.70 | 0.50 |

According to Table 3, the probabilities $P(g_i=0|S_1)$ are always greater than 0.50. This is preferable for run length encoding. On the contrary, the probabilities $P(g_i=0|S_2)$ are not always greater than 0.50 as listed in Table 4. In this event, it is infeasible to effectively carry out run length encoding.

Figure 4:
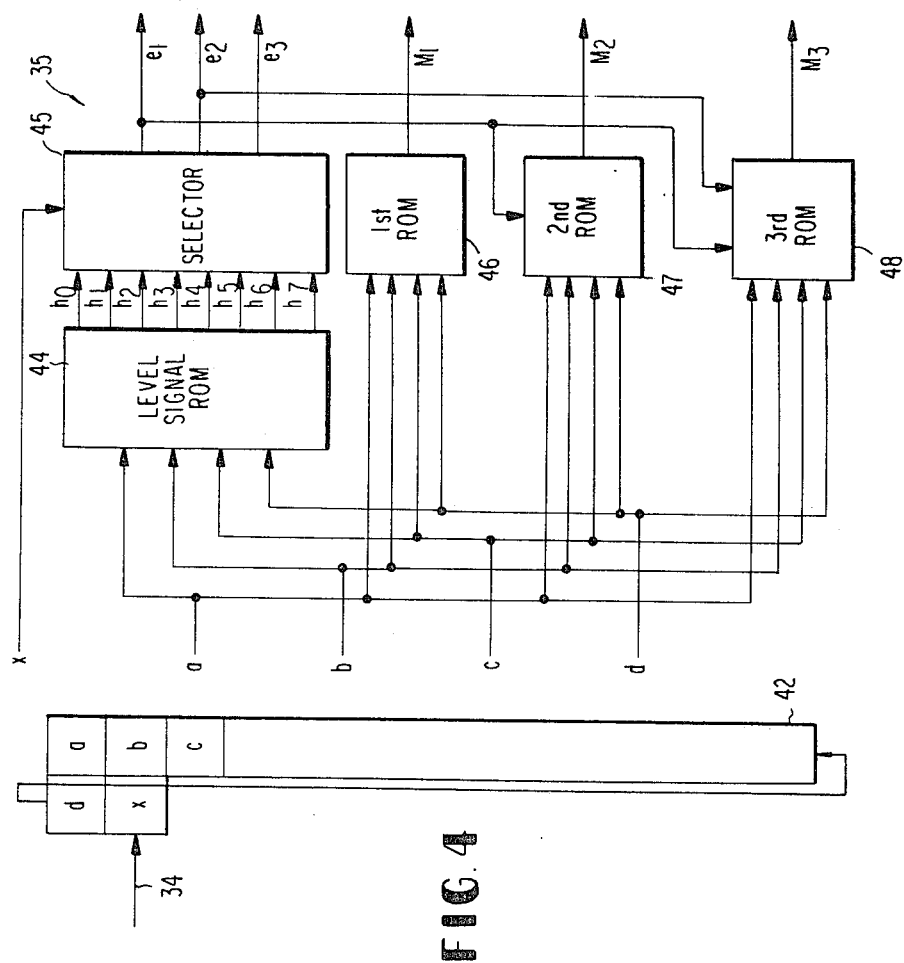
FIG. 4 is a block diagram of a prediction circuit for use according to a preferred embodiment of this invention in the encoder illustrated in FIG. 1.

Referring to FIG. 4, a novel prediction circuit is used as the prediction circuit 35 in the encoder illustrated in FIG. 1. The prediction circuit 35 comprises the shift register 42 of the type illustrated with reference to FIG. 2. Responsive to the reference signal S, a level signal producing ROM 44 produces zeroth through seventh level signals $h_k$'s or $h_0$ through $h_7$ representative of the respective levels 0 through 7 to be taken by the particular picture element signal x. The zeroth through the seventh level signals $h_0$ to $h_7$ do not represent the levels 0 through 7, respectively, but are arranged according to the first probabilities, now denoted by $P(h_k|S_j)$, that the particular picture element signal x will take the respective levels represented by the level signals $h_k$'s when the reference signal S is the j-th reference signal $S_j$. If the probabilities $P(h_k|S_j)$ are equal for two or more levels, the higher level is represented by the level signal $h_k$ having a smaller suffix k merely for convenience of description. The suffixes k's of the level signals $h_k$'s thus represent zeroth through seventh serial numbers assigned to the respective first probabilities $P(h_k|S_j)$ for each of all reference signals $S_j$'s. As will readily be understood, zeroth through seventh serial numbers starting from any integer and not consecutively, are equivalent to the above-described serial numbers k's. The serial number k and the level signal $h_k$ are shown in Table 5 for the first reference signal $S_1$ and in Table 6 for the second reference signal $S_2$.

TABLE 5

| $P(h_k|S_1)$ | 0.40 | 0.20 | 0.20 | 0.05 | 0.05 | 0.04 | 0.04 | 0.02 |
|---|---|---|---|---|---|---|---|---|
| k | 0 | 1 | 2 | 3 | 4 | 5 | 6 | 7 |
| $h_k$ | 4 | 5 | 3 | 6 | 2 | 7 | 1 | 2 |

TABLE 6

| $P(h_k|S_2)$ | 0.25 | 0.25 | 0.10 | 0.10 | 0.10 | 0.10 | 0.05 | 0.05 |
|---|---|---|---|---|---|---|---|---|
| k | 0 | 1 | 2 | 3 | 4 | 5 | 6 | 7 |
| $h_k$ | 6 | 2 | 7 | 5 | 3 | 1 | 4 | 0 |

Supplied with the particular picture element signal x, a level signal or serial number selector 45 selects one of the level signals $h_k$'s as a coincident level signal $h_{(k,x)}$ that has a level best coincident with the actual level x. The selector 45 produces a set of first through third prediction error codes $e_i$'s or $e_1$ through $e_3$ representative of the suffix or serial number (k,x) as a binary number representative of a prediction error e. The first prediction error code $e_1$ represents the most significant bit of the prediction error e and the third prediction error code $e_3$, the least significant bit. With the prediction error codes $e_i$'s, it is possible to render the probability that each prediction error code $e_i$ has the binary "0" level, always not less than the probability that each prediction error code $e_i$ is of the binary "1" level, as will shortly be described. The method of predicting the predicted level $\hat{x}$ as herein described may be referred to as a novel prediction method. The prediction error e and the prediction error code $e_i$ are listed in Table 7 for the first reference signal $S_1$ and in Table 8 for the second reference signal $S_2$. For example, let the reference signal S and the actual level x be $S_1$ and 5, respectively. According to Table 5, the suffix is 1 when the level signal $h_k$ represents the level 5. The selected serial number (k,x), namely, the prediction error e, is therefore decimal 1. In the binary system, the prediction error codes $e_1$ through $e_3$ have binary "0," binary "0," and binary "1" levels, respectively. As in Tables 3 and 4, the probability $P(e_i|S_j)$ that each prediction error code $e_i$ has a certain binary value or level $e_i$ (either binary "0" or binary "1" level) is calculated and given in Table 9 for the first reference signal $S_1$ and in Table 10 for the second reference signal $S_2$.

TABLE 7

| x | 0 | 1 | 2 | 3 | 4 | 5 | 6 | 7 |
|---|---|---|---|---|---|---|---|---|
| $P(x|S_1)$ | 0.02 | 0.04 | 0.05 | 0.20 | 0.40 | 0.20 | 0.05 | 0.04 |
| e | 7 | 6 | 4 | 2 | 0 | 1 | 3 | 5 |
| $e_1$ | 1 | 1 | 1 | 0 | 0 | 0 | 0 | 1 |
| $e_2$ | 1 | 1 | 0 | 1 | 0 | 0 | 1 | 0 |
| $e_3$ | 1 | 0 | 0 | 0 | 0 | 1 | 1 | 1 |

TABLE 8

| x | 0 | 1 | 2 | 3 | 4 | 5 | 6 | 7 |
|---|---|---|---|---|---|---|---|---|
| $P(x|S_2)$ | 0.05 | 0.10 | 0.25 | 0.10 | 0.05 | 0.10 | 0.25 | 0.10 |
| e | 7 | 5 | 1 | 4 | 6 | 3 | 0 | 2 |
| $e_1$ | 1 | 1 | 0 | 1 | 1 | 0 | 0 | 0 |
| $e_2$ | 1 | 0 | 0 | 1 | 1 | 0 | 0 | 1 |
| $e_3$ | 1 | 1 | 1 | 0 | 0 | 1 | 0 | 0 |

TABLE 9

| | $P(e_1|S_1)$ | $P(e_2|S_1)$ | $P(e_3|S_1)$ |
|---|---|---|---|
| $e_i = 0$ | 0.85 | 0.69 | 0.69 |
| $e_i = 1$ | 0.15 | 0.31 | 0.31 |

TABLE 10

|  | $P(e_1\|S_2)$ | $P(e_2\|S_2)$ | $P(e_3\|S_2)$ |
|---|---|---|---|
| $e_i = 0$ | 0.70 | 0.70 | 0.50 |
| $e_i = 1$ | 0.30 | 0.30 | 0.50 |

Turning to FIGS. 5 (a), 5 (b), and 5 (c) for a short while, the reasons will be described why the probability that each prediction error code $e_i$ has the binary "0" level, becomes not less, irrespective of the reference signal S, than the probability that each code $e_i$ is of the binary "1" level. FIGS. 5 (a), 5 (b), and 5 (c) show the same graph for the second reference signal $S_2$ except for the hatched areas, which will presently be described. In marked contrast to FIG. 3 (b), where the probability distribution has a plurality of peaks, the probability distribution illustrated in FIGS. 5 (a) through 5 (c) monotonously decreases with an increase in the suffix k to the level signals $h_k$'s. The above-described probability $P(e_i|S_j)$ will be called a conditional probability for the i-th prediction error code $e_i$. The probability $P(e_i=0|S_j)$ that the i-th code $e_i$ is of the binary "0" level, is herein named a second probability.

Referring more particularly to FIG. 5 (a), let the actual level x be one of the levels 6, 2, 7, and 5, which are represented by the level signals $h_0$, $h_1$, $h_2$, and $h_3$ shown by the hatched areas. The prediction errors e's become 0, 1, 2, and 3, for which the first prediction error code $e_1$ is always of the binary "0" level. In FIG. 5 (b), let the actual level x be one of the levels 6, 2, 3, and 1. The level signals are $h_0$, $h_1$, $h_4$, and $h_5$ shown again with hatches. The prediction errors e's are 0, 1, 4, and 5, for which the second code $e_2$ always has the binary "0" level. In FIG. 5 (c), let the actual level x be one of the levels 6, 7, 3, and 4. The level signals are $h_0$, $h_2$, $h_4$, and $h_6$, once again indicated with hatches. The prediction errors e's are 0, 2, 4, and 6, for which the third code $e_3$ always has the binary "0" level. The second probabilities $P(e_i=0|S_2)$ are therefore always not less than the probabilities $P(e_i=1|S_2)$ as quantitatively listed in Table 10. This applies irrespective of the reference signal S.

Turning back to FIG. 4, a first ROM 46 is responsive to the reference signal S alone and produces a first mode code $M_1$. Responsive to the reference signal S and the first prediction error code $e_1$, a second ROM 47 produces a second mode code $M_2$. Supplied with the reference signal S and the first and the second prediction error codes $e_1$ and $e_2$, a third ROM 48 produces a third mode code $M_3$. Each mode code $M_i$ is thus produced so as to enable the data compression encoding of the prediction error codes $e_i$'s to be effectively carried out as will be described in the following. The first through the third mode codes $M_1$ to $M_3$ will collectively be called a mode signal M.

As described hereinabove, the first mode code $M_1$ is produced in consideration of the conditional probability $P(e_1|S_j)$ for the first prediction error code $e_1$. Each of the second and the following mode codes $M_2$ and so forth is produced with the conditional probability for that prediction error code modified. More particularly, the second mode code $M_2$ is produced in consideration of a second-bit modified conditional probability $P(e_2|S_j, e_1)$ that the second prediction error code $e_2$ has a certain level $e_2$ (either binary "0" or "1" level) under the conditions such that the reference signal S is found to be the j-th reference signal $S_j$ and that the first prediction error code $e_1$ is found to be of the binary level $e_1$ (either binary "0" or "1"). The third mode code $M_3$ is produced dependent on a third-bit conditional probability $P(e_3|S_j, e_1, e_2)$ that the third prediction error code $e_3$ has a certain level $e_3$ under the conditions such that the reference signal S is found to be the j-th reference signal $S_j$ and that the first and the second prediction error codes $e_1$ and $e_2$ have the levels $e_1$ and $e_2$, respectively. When the modified conditional probability is dealt with, it is possible to denote the first-bit second probability simply by $P(0|S_j)$. The second-bit modified second probability is denoted by $P(0|S_j, e_1)$, namely, either by $P(0|S_j, 0)$ or $P(0|S_j, 1)$. The third-bit modified second probability is represented by $P(0|S_j, e_1, e_2)$, namely, by $P(0|S_j, 0, 0)$, $P(0|S_j, 0, 1)$, $P(0|S_j, 1, 0)$ or $P(0|S_j, 1, 1)$.

It is possible to numerically calculate the modified second probabilities according to the following equations by the use of the probabilities $P(h_k|S_j)$, such as those listed in Tables 5 and 6. The modified second probabilities for the i-th prediction error code $e_i$ having the binary "1" level, is calculated by subtracting the modified second probability for that prediction error code, from unity. The results of calculation are exemplified in Tables 11 through 13 for the first reference signal $S_1$ and in Tables 14 through 16 for the second reference signal $S_2$.

TABLE 11

|  | $P(e_1\|S_1)$ |
|---|---|
| $e_1 = 0$ | 0.85 |
| $e_1 = 1$ | 0.15 |

TABLE 12

|  | $P(e_2\|S_1, e_1)$ | |
|---|---|---|
|  | $e_1 = 0$ | $e_1 = 1$ |
| $e_2 = 0$ | 0.706 | 0.6 |
| $e_2 = 1$ | 0.294 | 0.4 |

TABLE 13

|  | $P(e_3\|S_1, e_1, e_2)$ | | | |
|---|---|---|---|---|
|  | $e_1 = 0$ | | $e_1 = 1$ | |
|  | $e_2 = 0$ | $e_2 = 1$ | $e_2 = 0$ | $e_2 = 1$ |
| $e_3 = 0$ | 0.667 | 0.80 | 0.556 | 0.666 |
| $e_3 = 1$ | 0.333 | 0.20 | 0.444 | 0.334 |

TABLE 14

|  | $P(e_1\|S_2)$ |
|---|---|
| $e_1 = 0$ | 0.7 |
| $e_1 = 1$ | 0.3 |

TABLE 15

|  | $P(e_2\|S_2, e_1)$ | |
|---|---|---|
|  | $e_1 = 0$ | $e_1 = 1$ |
| $e_2 = 0$ | 0.714 | 0.667 |
| $e_2 = 1$ | 0.286 | 0.333 |

TABLE 16

|  | $P(e_3\|S_2, e_1, e_2)$ | | | |
|---|---|---|---|---|
|  | $e_1 = 0$ | | $e_1 = 1$ | |
|  | $e_2 = 0$ | $e_2 = 1$ | $e_2 = 0$ | $e_2 = 1$ |
| $e_3 = 0$ | 0.5 | 0.5 | 0.5 | 0.5 |
| $e_3 = 1$ | 0.5 | 0.5 | 0.5 | 0.5 |

The equations are:

$$P(O|S_j) = \sum_{k=0}^{3} P(h_k|S_j),$$

-continued $$P(O|S_j, 0) = \left[\sum_{k=0}^{1} P(h_k|S_j)\right] / \left[\sum_{k=0}^{3} P(h_k|S_j)\right],$$

$$P(O|S_j, 1) = \left[\sum_{k=4}^{5} P(h_k|S_j)\right] / \left[\sum_{k=4}^{7} P(h_k|S_j)\right],$$

$$P(O|S_j, 0, 0) = P(h_0|S_j) / \left[\sum_{k=0}^{1} P(h_k|S_j)\right],$$

$$P(O|S_j, 0, 1) = P(h_2|S_j) / \left[\sum_{k=2}^{3} P(h_k|S_j)\right],$$

$$P(O|S_j, 1, 0) = P(h_4|S_j) / \left[\sum_{k=4}^{5} P(h_k|S_j)\right],$$

and $$P(O|S_j, 1, 1) = P(h_6|S_j) / \left[\sum_{k=6}^{7} P(h_k|S_j)\right].$$

Figure 6:
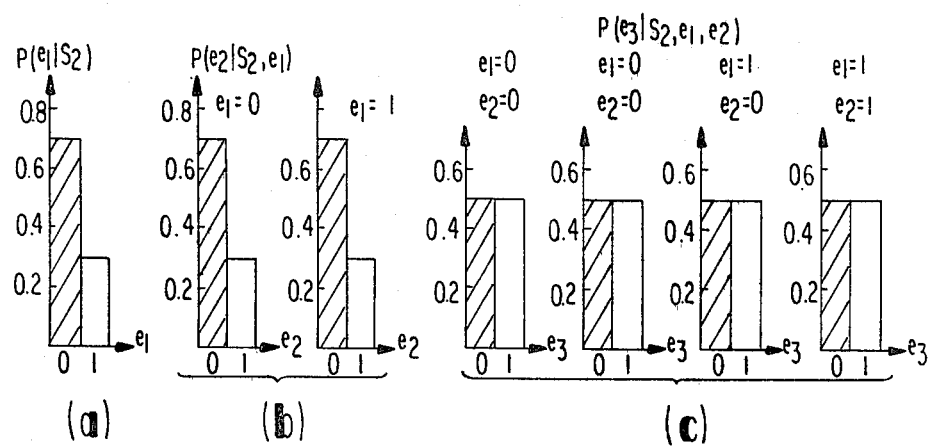
FIGS. 6(a), 6(b), and 6(c) show graphs representative of the probabilities modified for use in producing mode codes by the prediction circuit shown in FIG. 4.

Turning temporarily to FIGS. 6 (a), 6 (b), and 6 (c), the first-bit through the third-bit modified conditional probabilities $P(e_1|S_j)$, $P(e_2|S_j, e_1)$, and $P(e_3|S_j, e_1, e_2)$ will be considered in connection with FIGS. 5 (a) through (c). In FIG. 6 (a), the first-bit second probability $P(0|S_2)$ is the probability that the actual level x is one of the levels represented by the level signals $h_0$ through $h_3$ when the reference signal S is the second reference signal $S_2$. The probability in question is given by a ratio of a sum of the areas hatched in FIG. 5 (a) to a sum of the hatched and the unhatched areas. The counterpart first-bit modified conditional probability $P(e_1=1|S_2)$ is equal to a ratio of a sum of the unhatched areas to the whole area. In FIG. 6 (b), one of the modified second probabilities $P(0|S_2, 0)$ for the case where the first prediction error code $e_1$ has the binary "0" level, is the probability that the actual level x is one of the levels represented by the level signals $h_0$ and $h_1$. This probability is equal to a ratio of a sum of the hatched areas in a first region on the left side of a vertical dashed line in FIG. 5 (b), to the whole area in the first region. The counterpart modified conditional probability $P(e_2=1|S_2, 0)$ is equal to a ratio of a sum of the unhatched areas in the first region to the whole area in that region. The other second-bit modified second probability $P(0|S_2, 1)$ for the case where the first prediction error code $e_1$ is of the binary "1" level, is equal to a ratio of a sum of the hatched areas in a second region right to the dashed line, to the whole area in the second region. In FIG. 6 (c), a first of the third-bit modified second probability $P(0|S_2, 0, 0)$ under the conditions such that the first and the second prediction error codes $e_1$ and $e_2$ have the binary "0" level, is the probability that the actual level x is given by the level signal $h_0$. Namely, the probability is equal to a ratio of the hatched area in a first region left to the leftmost dashed line in FIG. 5 (c), where both first and second prediction error codes $e_1$ and $e_2$ have the binary "0" level, to the whole area in the first region. A second of the third-bit modified second probability $P(0|S_2, 0, 1)$ is equal to a ratio of the hatched area in a second region between the leftmost and the second leftmost dashed lines, to the whole area in that region. Other third-bit modified second probabilities and the counterpart modified conditional probabilities will be self-evident.

With reference to a predetermined threshold value for the modified conditional probability, such as 0.7, the first mode code $M_1$ is made to have the binary "0" level when the first-bit modified second probability $P(0|S_j)$ is equal to or greater than the predetermined threshold value. Otherwise, the first mode code $M_1$ is given the binary "1" level. The second mode code $M_2$ is given the binary "0" level when either of one and the other second-bit modified second probabilities $P(0|S_j, e_1)$'s is equal to or greater than the predetermined threshold value. Otherwise, the second mode code $M_2$ is made to have the binary "1" level. The third mode code $M_3$ is given the binary "0" level when any one of the first through the fourth third-bit modified second probabilities $P(0|S_j, e_1, e_2)$ is equal to or greater than the predetermined threshold value and, otherwise, the binary "1" level. Table 17 shows the mode codes $M_1$ through $M_3$ when the reference signal S is found to be the first reference signal $S_1$ and Table 18 shows the mode codes $M_1$ through $M_3$ when the reference signal S is the second reference signal $S_2$.

TABLE 17

|  | $e_1 = 0$ | | $e_1 = 1$ | |
|---|---|---|---|---|
|  | $e_2 = 0$ | $e_2 = 1$ | $e_2 = 0$ | $e_2 = 1$ |
| $M_1$ | | | 0 | |
| $M_2$ | | 0 | | 1 |
| $M_3$ | 1 | 0 | 1 | 1 |

TABLE 18

|  | $e_1 = 0$ | | $e_1 = 1$ | |
|---|---|---|---|---|
|  | $e_2 = 0$ | $e_2 = 1$ | $e_2 = 0$ | $e_2 = 1$ |
| $M_1$ | | | 0 | |
| $M_2$ | | 0 | | 1 |
| $M_3$ | 1 | 1 | 1 | 1 |

Figure 7:
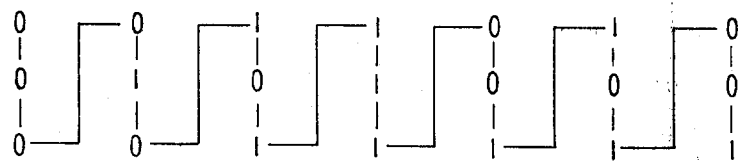
FIG. 7 shows a sequence in which prediction error codes produced by the prediction circuit depicted in FIG. 4 are subjected to run length encoding.

Referring to FIG. 7, it is possible to make the conventional one-dimensional run length encoder encode the first through the third prediction error codes $e_i$'s for the prediction errors e's decided for successive picture element signals, such as x, in the picture element signal sequence 31 by merely serially concatenating the prediction error codes $e_1$, $e_2$, $e_3$, $e_1$, $e_2$, $e_3$, and so forth. Data compression is possible because the prediction errors e's are determined as exemplified hereinabove so that the probability that each prediction error code $e_i$ and accordingly a partial concatenation of the prediction error codes having the binary "0" level is always not lower, irrespective of the reference signal S, than the probability that either a particular prediction error code or a short concatenation of the prediction error codes has the binary "1" level.

According to a certain known run length encoding technique for more effectively carrying out the data compression, attention is directed to the fact that the probability that the prediction error signal g described in conjunction with FIG. 2 is of the binary "0" level is high depending on the reference signal S. The prediction error signals g's are therefore grouped according to the reference signal S into two groups in which the probability is high and relatively low, respectively.

It is possible to use the mode codes $M_i$'s for the grouping taught by the known run length encoding technique. More particularly, the prediction error code $e_i$ is more probably binary "0" when the mode codes $M_i$'s have the binary "0" level. The conventional run length encoder is made to produce a relatively short run length code for a run of the binary "0" signal or signals. The probability that the prediction error code $e_i$ has the binary "0" level is not so high when the mode codes $M_i$'s have the binary "1" level. The encoder is made to produce a relatively long run length code for a run of the binary "1" signal or signals when the mode codes $M_i$'s have the binary "1" level. The mode codes $M_i$'s are, however, entirely different from the signals used in grouping according to the known technique in that the second and the third mode codes $M_2$ and $M_3$ are decided not only under the condition dependent on the reference signal S but also under the additional condition dependent on the first prediction error code $e_1$ and on the first and the second prediction error codes $e_1$ and $e_2$, respectively.

Figure 8:
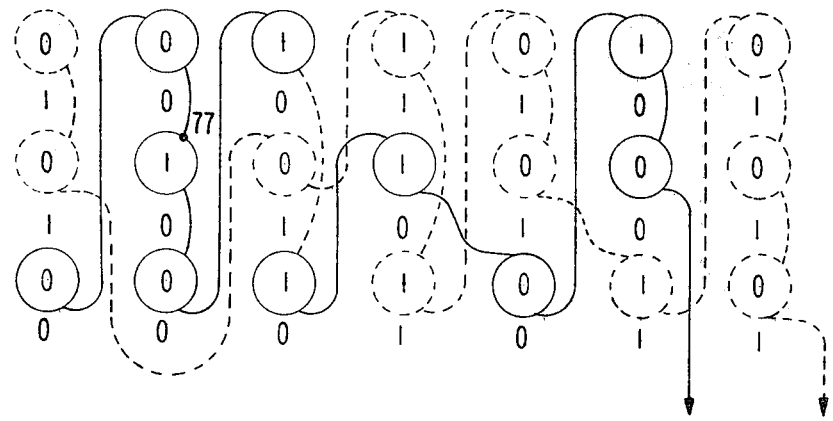
FIG. 8 shows two sequences in which the prediction error codes are subjected to run length encoding with the mode codes taken into consideration.

Turning to FIG. 8, the prediction error codes $e_1$'s for the successive picture element signals, such as x, are encoded in consideration of the mode codes $M_i$'s allotted thereto, in two sequences specified by a first and a second generally curved line when the encoding circuit 37 is a novel run length encoder to be later described in detail. In the illustrated example, the prediction error codes $e_i$'s encircled by solid lines are accompanied by the mode codes $M_i$'s having the binary "0" level, and those enclosed with dashed lines by the mode codes $M_i$'s having the binary "1" level. The first line concatenates the prediction error codes $e_i$'s accompanied by the binary "0" mode codes in the order of the first through the third prediction error codes $e_i$'s for the successive picture element signals. The second line concatenates the prediction error codes $e_i$'s accompanied by the binary "1" mode codes in the like manner. In other words, the second prediction error codes $e_2$'s are encoded in consideration of the reference signal S and the already encoded first prediction error code $e_1$ (either binary "0" or "1"). The third prediction error codes $e_3$'s are encoded in consideration of the reference signal S as well as the first and the second prediction error codes $e_1$ and $e_2$.

In order to clarify the difference, let first through third modified mode codes $M_1'$, $M_2'$, and $M_3'$ be dependent only on the reference signal S. For example, the mode codes $M_1'$ through $M_3'$ be given the binary "0" and "1" levels as listed in Table 19 for the first reference signal $S_1$ and in Table 20 for the second reference signal $S_2$, with 0.7 again used as the predetermined threshold value. The first mode code $M_1$ given in Table 17 is not different from the first modified mode code $M_1'$ given in Table 19. The second modified mode code $M_2'$ given in Table 19 is dependent only on the reference signal S. In contrast, the second mode code $M_2$ listed in Table 17 is given the binary "0" and "1" levels when the first prediction error code $e_1$ has the binary "0" and "1" levels, respectively. In other words, the latter mode code $M_2$ is classified more precisely. This applies to the third mode code $M_3$ given in Table 17. When the mode codes $M_i$'s are more precisely classified, the data compression is more effective. The same holds for the mode codes $M_i$'s given in Table 18 as compared with the modified mode codes $M_i'$'s listed in Table 20.

TABLE 19

| $M'_1$ | 0 |
| $M'_2$ | 1 |
| $M'_3$ | 1 |

TABLE 20

| $M_1'$ | 0 |
| $M_2'$ | 0 |
| $M_3'$ | 1 |

Figure 9:
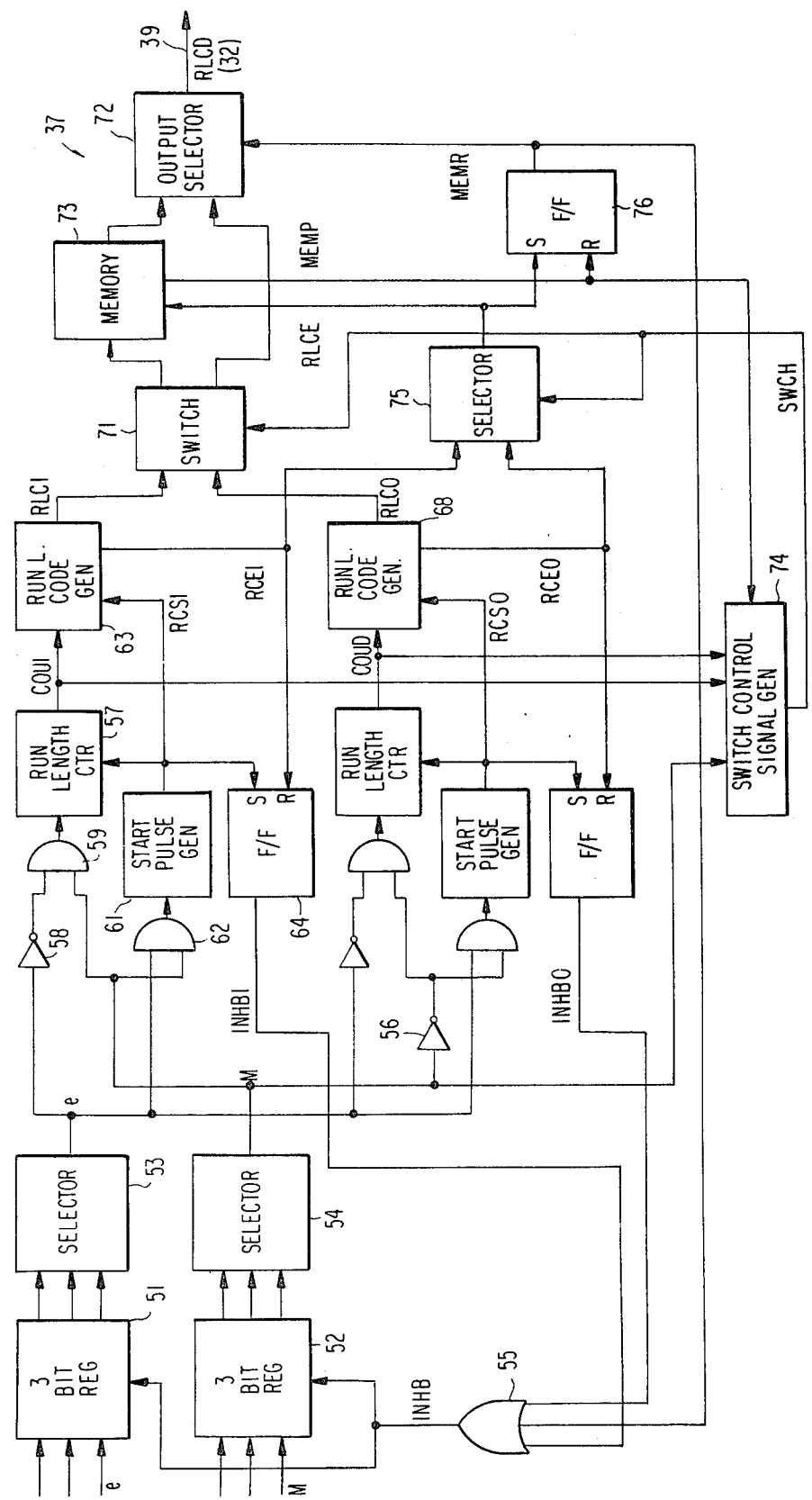
FIG. 9 is a block diagram of a run length encoding circuit for use in the encoder depicted in FIG. 1.
Figure 10:
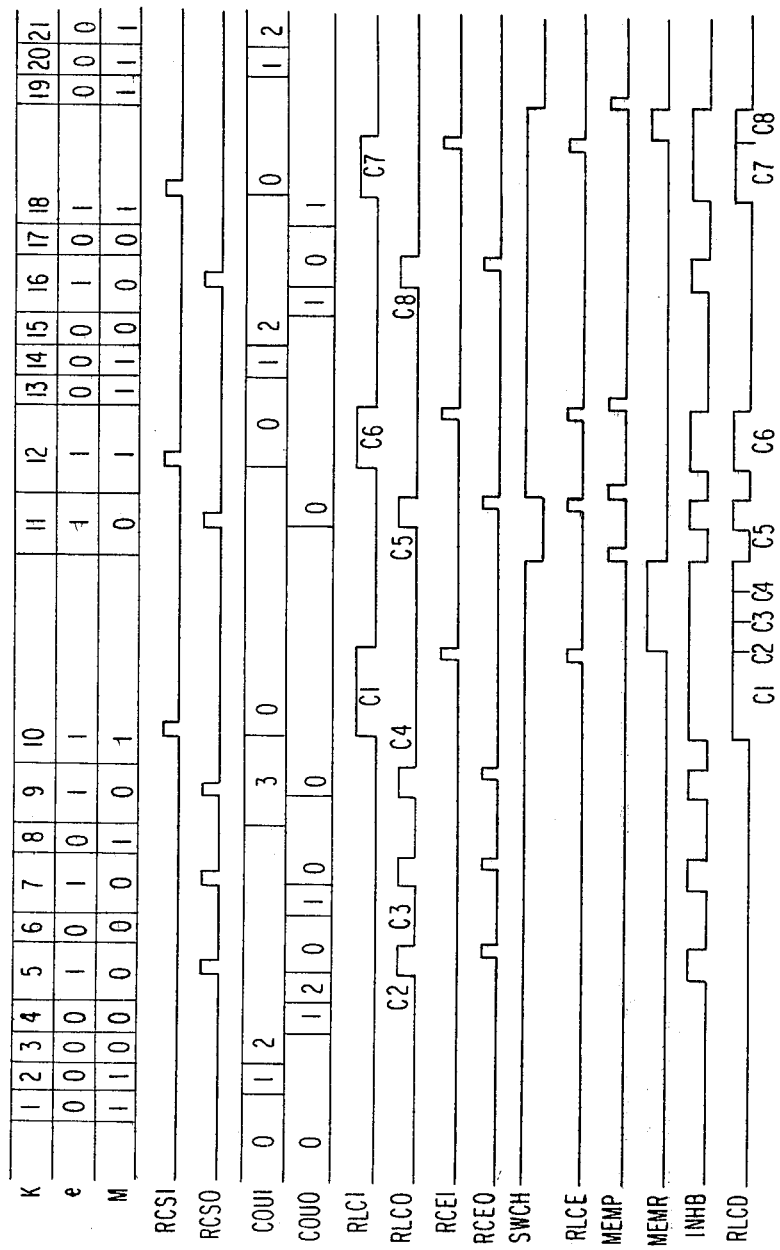
FIG. 10 is a time chart for use in describing operation of the run length encoding circuit shown in FIG. 9.

Referring now to FIGS. 9 and 10, a novel run length encoder depicted in FIG. 9 is operable as the encoding circuit 37 (FIG. 1) with signals exemplified in FIG. 10. In FIG. 10, K represents serial numbers given to the prediction error codes $e_1$, $e_2$, $e_3$, $e_1$, $e_2$, $e_3$, and so on for the successively predicted picture element signals, such as x, in the picture element signal sequence 31. The encoder 37 comprises a three-bit prediction error register 51 for registering a prediction error e at a time and a three-bit mode signal register 52 for a mode signal M produced for the prediction error e set in the prediction error register 51. A prediction error code selector 53 is for successively selecting the prediction error codes $e_1$ through $e_3$ of the prediction error e stored in the register 51. A mode code selector 54 is for successively selecting the mode codes $M_1$ through $M_3$ of the mode signal M set in the register 52 simultaneously with the accompanying prediction error codes $e_1$ through $e_3$. An OR gate 55 is for supplying an inhibit signal INHB of a high level, to be later described, to the registers 51 and 52 to suspend selection of the prediction error codes $e_i$'s and the mode codes $M_i$'s by the selectors 53 and 54.

Each prediction error code $e_i$ selected by the selector 53 is supplied directly to a first and a second part of the encoder 37. Each mode code $M_i$ selected by the selector 54 is supplied to the first and the second parts directly and through a mode code inverter 56, respectively. The first and the second parts are for producing first and second run length codes RLC1 and RLC0 when the mode code $M_i$ is of the binary "1" (high) and the binary "0" (low) levels, respectively. Inasmuch as the first and the second parts are similar in structure, the first part will mainly be described in the following.

As described hereinabove, the prediction error codes $e_i$'s are more probably low than high. Each part of the encoder 37 therefore encodes one or more successive low prediction error codes preceding each high prediction error code, to the first or the second run length code RLC1 or RLC0 as will presently be described. The first part comprises a run length counter 57 for counting the number of low prediction error code or codes supplied thereto through an inverter 58 and an AND gate 59 to produce a first count signal COU1 representative of the count or the run length. A run length code start pulse generator 61 detects an end of run. When supplied with each high prediction error code through an AND gate 62, the generator 61 produces a first run length code start pulse RCS1. Among others, the start pulse RCS1 sets the count signal COU1 in a first run length code generator 63 and then clears the counter 57. The first run length code RLC1 produced by the run length code generator 63 is relatively long and represents the run length given by the count signal COU1. At the end of the first run length code RLC1, the run length code generator 63 generates a first run length code end pulse RCE1.

A first inhibit signal producing circuit 64 is a flip-flop set by the first run length code start pulse RCS1 and reset by the first run length code end pulse RCE1 to produce the set output as a first inhibit signal INHB1, which is high during the first run length code RLC1 and is supplied to the registers 51 and 52 through the OR gate 55 as the inhibit signal INHB. In the second part, a second run length code generator 68 produces the second run length code RLC0 in response to a second count signal COU0 representative of a run length of the low prediction error code or codes to each of which a low mode code is allotted. A second inhibit signal INHB0 starts and ends with a second run length code start pulse RCS0 and a second run length code end pulse RCE0 and keeps the high level during the second run length code RLC0. Each second run length code RLC0 is shorter than the first run length code RLC1 and represents each relatively long run length represented by the second count signal COU0. With this, it is possible to raise the efficiency of data compression encoding.

In order to enable proper decoding to be carried out, the first and the second run length codes RLC1 and RLC0 must be arranged in the order of the run lengths represented thereby. For a more precise statement, it is to be noted that the prediction error codes $e_i$'s are produced in a sequence by the prediction error code selector 53 as designated by the serial number K. Each run has a leading prediction error code at the leading end in the sequence. Each run length code RLC1 or RLC0 should be arranged next to another run length code for a run having a leading prediction error code next preceding the leading prediction error code of the run to be represented by the first-mentioned run length code RLC1 or RLC0.

The run length encoder therefore comprises a switching circuit 71 for supplying the first and the second run length codes RLC1 and RLC0 directly to an output code selector 72 and to a memory 73 for temporary storage therein, respectively, when a switch control signal SWCH is rendered high as will shortly be described. When the switch control signal SWCH is low, the first and the second run length codes RLC1 and RLC0 are supplied to the memory 73 and directly to the selector 72, respectively. The switch control signal SWCH is rendered high by a switch control signal producing circuit 74 primarily if the mode code $M_i$ is high when the counters, such as 57, are put into a common initial state in which both of the first and the second count signals COU1 and COU0 are representative of zero. When high, the switch control signal SWCH represents the fact that a run depicted in FIG. 8 by the second line precedes another run indicated by the first line. Switching of the switch control signal SWCH between the high and the low levels will later be described more in detail.

A run length code end pulse selector 75 produces the first and the second run length code end pulses RCE1 and RCE0 as a single run length code end pulse RLCE when the switch control signal SWCH is high and low, respectively. The single run length code end pulse RLCE makes the memory 73 supply the memorized run length code or codes RLC1 or RLC0 to the selector 72. As soon as rendered empty, the memory 73 produces a memory empty pulse MEMP. A selector control circuit 76 is a flip-flop set by the single run length code end pulse LRCE and reset by the memory empty pulse MEMP to supply the set output as a memory read signal MEMR to the output selector 72. When high, the memory read signal MEMR indicates the fact that the memory 73 is being read. When the memory read signal MEMR is high and low, the selector 72 produces the memorized run length code or codes RLC1 or RLC0 supplied from the memory 73 and the run length code or codes RLC0 or RLC1 supplied directly from the switching circuit 72, respectively, as the compression encoded signal 32 comprising output run length codes RLCD.

The memory read signal MEMR is supplied also to the OR gate 55 to provide the inhibit signal INHB when the memory read signal MEMR is high. The memory empty pulse MEMP is supplied also to the switch control signal producing circuit 74 as a trigger pulse. Conditioned by the mode code $M_i$ and the first and the second count signals COU1 and COU0, the circuit 74 renders the switch control signal SWCH high and low as listed in Table 21.

TABLE 21

| $M_i$ | 0 | 1 1 | 0 or 1 | 0 or 1 |
|---|---|---|---|---|
| COU1 | 0 | 0 | 0 | 1, 2, ... |
| COU0 | 0 | 0 | 1, 2, ... | 0 |
| SWCH | 1 | 0 | 0 | 1 |

Referring more specifically to FIG. 10 and also to FIGS. 8 and 9, an end of run appears for the first time in the prediction error code sequences at 77 (FIG. 8) when the prediction error code $e_i$ is turned from the binary "0" (low) level to the binary "1" (high) level at K=5. The prediction error codes preceding the prediction error code at K=5 are arranged along the first line accompanied by the mode codes $M_i$'s of the binary "0" level. In other words, the mode codes $M_i$'s are kept at the low level during the run. The second part is therefore put into operation at first while the first part is still inoperative. The second count signal COU0 represents a count of two. The second run length code start pulse RCS0 is rendered high to set the count 2 in the second run length code generator 68, to reset the second count signal COU0 to zero, and to turn the second inhibit signal INBH0 high. It is hereby to be noted that another run for the pediction error codes $e_i$'s having the low level and sequenced along the second line accompanied by the mode codes $M_i$'s of the binary "1" (high) level has already started as a first of the runs at K=1 and is still continued beyond K=5 and that the first-mentioned run is a second of the runs that has started at K=3 during continuance of the first run. Before production of a run length code for the first run C1, a second run length code RLC0 representative of the run length of two counts is therefore produced as a run length code for the second run C2. A second run length code end pulse RCE0 is produced to render the second inhibit signal INHB0 low. Inasmuch as the switch control signal SWCH is high, the run length code C2 is stored in the memory 73. Furthermore, the second run length code end pulse RCE0 is not produced as the single run length code end pulse RLCE.

Similarly, second run length codes RLC0 are successively produced prior to the run length code for the first run C1 at K=7 and K=9 as run length codes for third and fourth runs C3 and C4 to represent a one-count run length and a zero-count run length, respectively, as counted with attention directed to the prediction error codes $e_i$'s having the low level and accompanied by the low mode codes. In the meantime, the first run is still in progress. The run length codes C3 and C4 are stored in the memory 73.

At K=10, the prediction error code $e_i$ for the first run (the high mode codes $M_i$'s) turns at last from low to high. The first part is put into operation for the first time. The first count signal COU1 represents a count of three. The end of run is detected by the run length code start pulse generator 61. A first run length code start pulse RCS1 is produced to set the count of three in the first run length code generator 63 to reset the first count signal COU1 to zero and to turn the first inhibit signal INHB1 to high. Inasmuch as the switch control signal SWCH is high, a first run length code RLC1 produced as the run length code for the first run C1 is transmitted to the output selector 72 through the switching circuit 71. The first run length code generator 63 produces a first run length code end pulse RCE1 which is selected by the run length code end pulse selector 76 as the single run length code end pulse RLCE.

Before production of the single run length code end pulse RLCE, the memory read signal MEMR is kept low. The run length code for the first run C1 is therefore produced as the first one of the output run length codes RLCD. Although produced after the run length codes for the second through the fourth runs C2 to C4, the run length code for the first run C1 that started at $K=1$ is therefore produced as the first of the output run length codes RLCD. The single run length code end pulse RLCE turns the memory read signal MEMR high. The inhibit signal INHB is kept high. In the meanwhile, the single run length code end pulse RLCE makes the memory 73 successively deliver the memorized run length codes C2 through C4 to the output selector 72. The run length codes C2 to C4 are produced as second through fourth ones of the output run length codes RLCD. Meanwhile, the serial number K is kept at 10 by the inhibit signal INHB.

At $K=11$, the memory 73 produces a memory empty pulse MEMP. The memory read signal MEMR is given the low level to stop read out of the memory 73 and to turn the inhibit signal INHB and the switch control signal SWCH low. Inasmuch as the mode code $M_i$ is low, it is understood that a run along the first line has started and ended with a zero run length as a fifth run. A second run length code for the fifth run C5 is produced. The low switch control signal SWCH sends the run length code C5 to the output selector 72 through the switching circuit 71. The run length code C5 is produced as a fifth one of the output run length codes RLCD. The second run length code generator 68 generates a second run length code end pulse RCE0 which is selected by the run length code end pulse selector 75 as the single run length code end pulse RLCE. The memory read signal MEMR is turned high. The memory 73 is empty. The memory empty pulse MEMP is therefore immediately produced. The memory read signal MEMR is rendered low. Inasmuch as the memory read signal MEMR is only momentarily high, the high memory read signal is not depicted in FIG. 10. The output selector 72 stops read out of the memory 73 and selects the output of the switching circuit 71.

At $K=12$, the first and the second count signals COU1 and COU0 are in the common initial state. Inasmuch as the mode code $M_i$ is high, the switch control signal SWCH is turned high. The prediction error code $e_i$ is high. This shows that a run for a sixth run has started and ended with a zero run length. The run is along the second line, namely, for the mode code $M_i$ of the high level. A first run length code for the sixth run C6 is therefore produced and is supplied to the output selector 72 to be produced as a sixth one of the output run length codes RLCD. The run length code generator 63 produces a first run length code end pulse RCE1 which is selected as the single run length code end pulse RLCE. The memory read signal MEMR is rendered high. The memory 73 is, however, empty and immediately produces the memory empty pulse MEMP. The memory read signal MEMR is immediately turned low. The inhibit signal INHB is also given the low level.

At $K=13$, the first and the second count signals COU1 and COU0 are in the common initial state. The mode code $M_i$ is high. The switch control signal SWCH is turned high. The prediction error code $e_i$ is low. A seventh run therefore starts along the second line (for the high mode codes).

At $K=16$, the prediction error code $e_i$ turns high. The mode code $M_i$ has been low ever since $K=15$. An eighth run along the first line (for the low mode codes) therefore has a one-count run length. A second run length code RLC0 is produced as a run length code for the eighth run C8 and is set in the memory 73.

At $K=18$, the prediction error code $e_i$ in rendered high. The mode code $M_i$ is high. The seventh run started at $K=13$ therefore ends with a run length of two counts. A first run length code RLC1 is produced as a run length code for the seventh run C7 and is selected by the output selector 72 as a seventh one of the output run length codes RLCD. The first run length code generator 63 produces a first run length code end pulse RCE1 which is selected as the single run length code end pulse RLCE. The memory read signal MEMR is turned high. The memory 73 supplies the memorized run length code C8 to the output selector 72 and makes the latter produce the previously generated run length code C8 as an eighth one of the output run length codes RLCD next following the seventh one of the output run length codes RLCD. In the meantime, the inhibit signal INHB is high. The memory 73 produces a memory empty pulse MEMP which turns the memory read signal MEMR low.

At $K=19$, the memory empty pulse MEMP is supplied to the switch control signal producing circuit 74. Inasmuch as the first and the second count signals COU1 and COU0 represent zero and other than zero, respectively, the switch control signal SWCH is rendered low irrespective of the mode code $M_i$. This shows that the second run length counter 68 is counting the run length of a ninth run along the second line and that a run length code for the ninth run (not shown) should later be supplied to the output selector 72 through the switching circuit 71 to be produced as a ninth one of the output run length codes RLCD that next follows the eighth one of the output run length codes RLCD.

Figure 11:
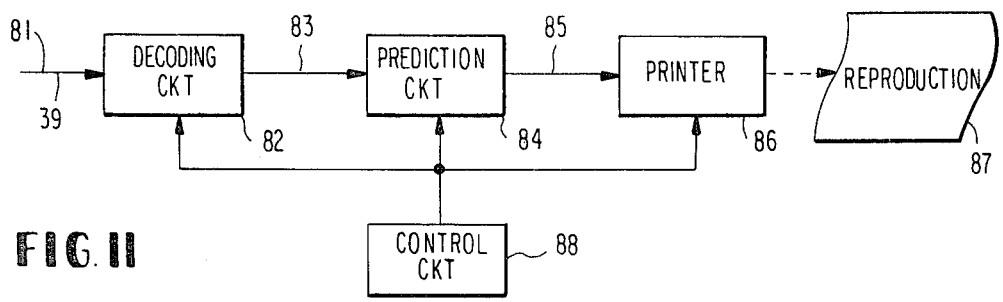
FIG. 11 is a block diagram of a decoder for use in the system described in conjunction with FIG. 1.

Turning now to FIG. 11, it will be assumed that a decoder is coupled to the encoder illustrated with reference to FIG. 1 through the data link 39 and is supplied with the compression encoded signal 32 comprising the output run length codes RLCD of the type described as an input compression encoded signal 81 through the data link 39. Responsive to the compression encoded signal 81, an expansion decoding circuit 82 produces a sequence of expansion decoded reproductions of the prediction error codes 83 in cooperation with a prediction circuit 84 which produces a sequence of eight-level reproduced picture element signals 85. Responsive to the reproduced picture element signal sequence 85, a printer or recorder 86 reproduces the pattern or picture on a recording medium 87. A control circuit 88 is for producing clock pulses, control signals, and synchronizing signals for controlling the expansion decoding circuit 82, the prediction circuit 84, and the printer or recorder 86. The reproduced picture element signals correspond to the respective picture element signals encoded into the compression encoded signal 32 or 81.

Figure 12:
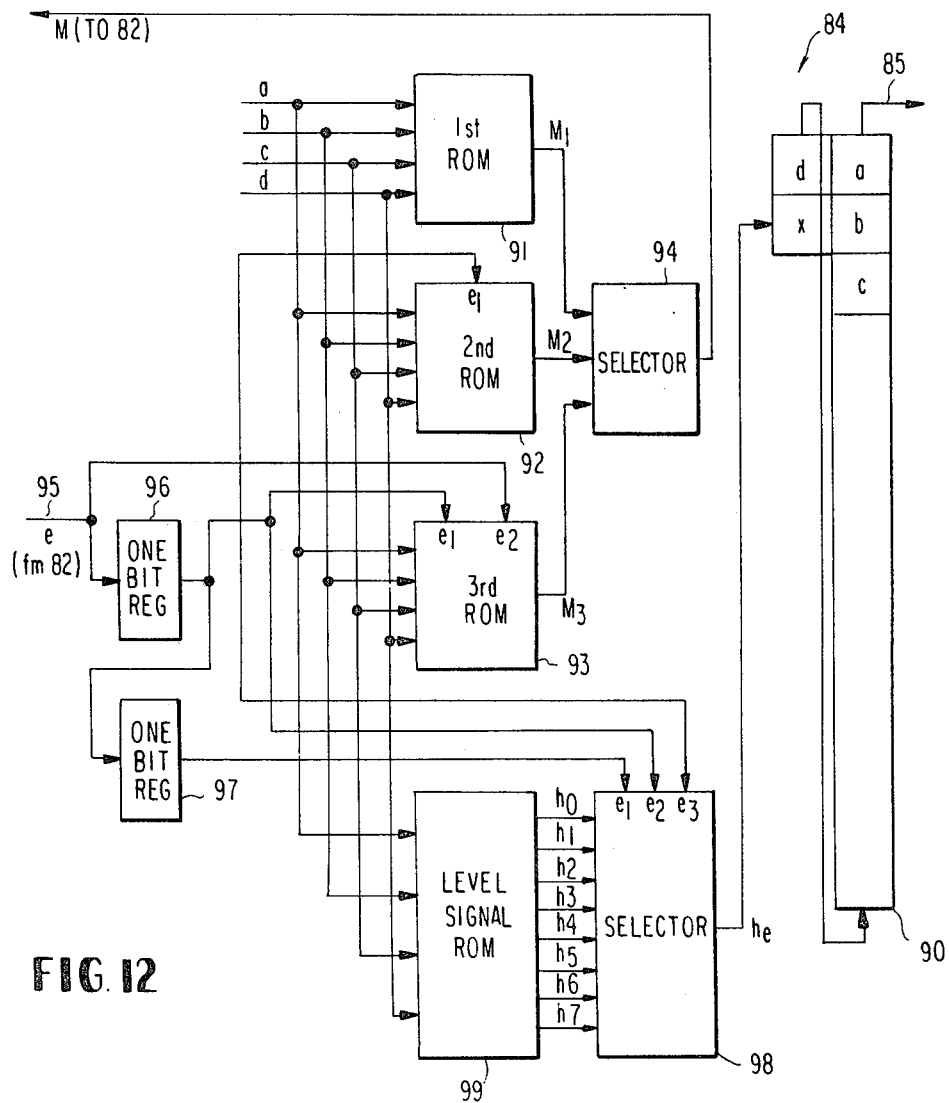
FIG. 12 is a block diagram of a prediction circuit for use in combination with the prediction circuit illustrated in FIG. 4 in the decoder shown in FIG. 11.

Referring to FIG. 12, the prediction circuit 84 is for reproducing each picture element signal of the sequence 85 and comprises a 3(R+2)-bit shift register 90 for that portion of the reproduced picture element signal sequence 85 which includes a reproduced reference signal S consisting of the reproduced picture element signals a through d for a particular picture element signal x being reproduced (the same reference letters being used merely for simplicity of denotation). The reproduced reference signal S has the predetermined relationship with respect to the particular picture element signal x. Responsive to the reproduced reference signal S, a first mode code decision ROM 91 produces a reproduction of the first mode code $M_1$ (one bit) according to Tables 17 and 18 and the like tables. Second and third mode code decision ROM's 92 and 93 will presently be described. Responsive to the control signal supplied from the control circuit 88, a mode code selector 94 selects the first mode code $M_1$ and supplies the same to the decoding circuit 82. As will later be described in detail, the decoding circuit 82 reproduces a first prediction error code $e_1$.

The reproduced first prediction error code $e_1$ is supplied to the prediction circuit 84 through a connection 95 as one of the prediction error codes $e_i$'s of the particular picture element signal x. The first prediction error code $e_1$ is supplied to a first one-bit register 96. The first prediction error code $e_1$ is supplied also to the second mode code decision ROM 92 as an address datum in addition to the reproduced reference signal S. The second mode code decision ROM 92 reproduces a second mode code $M_2$ according to Tables 17 and 18 and the like tables. The reproduction of the second mode code $M_2$ is now selected by the selector 94 and is sent to the decoding circuit 82 which supplies in turn a reproduced second prediction error code $e_2$ to the connection 95. The third mode code decision ROM 93 is accessed by the reproduced reference signal S and additionally by the first prediction error code $e_1$ set in the first one-bit register 96 and the second prediction error code $e_2$ supplied through the connection 95 and produces a third mode code $M_3$ according to Tables 17, 18, and so forth. The reproduction of the third mode code $M_3$ is supplied to the decoding circuit 82 through the selector 94. The first prediction error code $e_1$ is moved to a second one-bit register 97. The reproduced second prediction error code $e_2$ is set in the first one-bit register 96. A level signal selection circuit 98 is supplied with the reproductions of the first through the third mode codes $M_1$ to $M_3$ from the second and the first one-bit registers 97 and 96 and from the connection 95 as a control signal e (the same reference letter being used) representative of a reproduced prediction error e having the reproduced first prediction error code $e_1$ as the most significant bit and the third prediction error code $e_3$ as the least significant bit. Responsive to the reproduced reference signal S, a serial number or level signal decision ROM 99 produces reproduced level signals $h_0$ through $h_7$ (each three bits) according to Tables 5 and 6 and the similar tables and supplies the same to the level signal selection circuit 98 as input data.

The level signal selection circuit 98 selects one of the input data $h_0$ through $h_7$ that has a suffix k given by the binary number represented by the control signal e. The selected level signal $h_e$ is supplied to the shift register 90 as the particular picture element signal x. The shift register 90 is shifted one stage so that the reproduced particular element signal x moves to the stage for one of the reproduced reference signal picture element signals for a picture element signal to be reproduced next following the particular picture element signal x described above.

Figure 13:
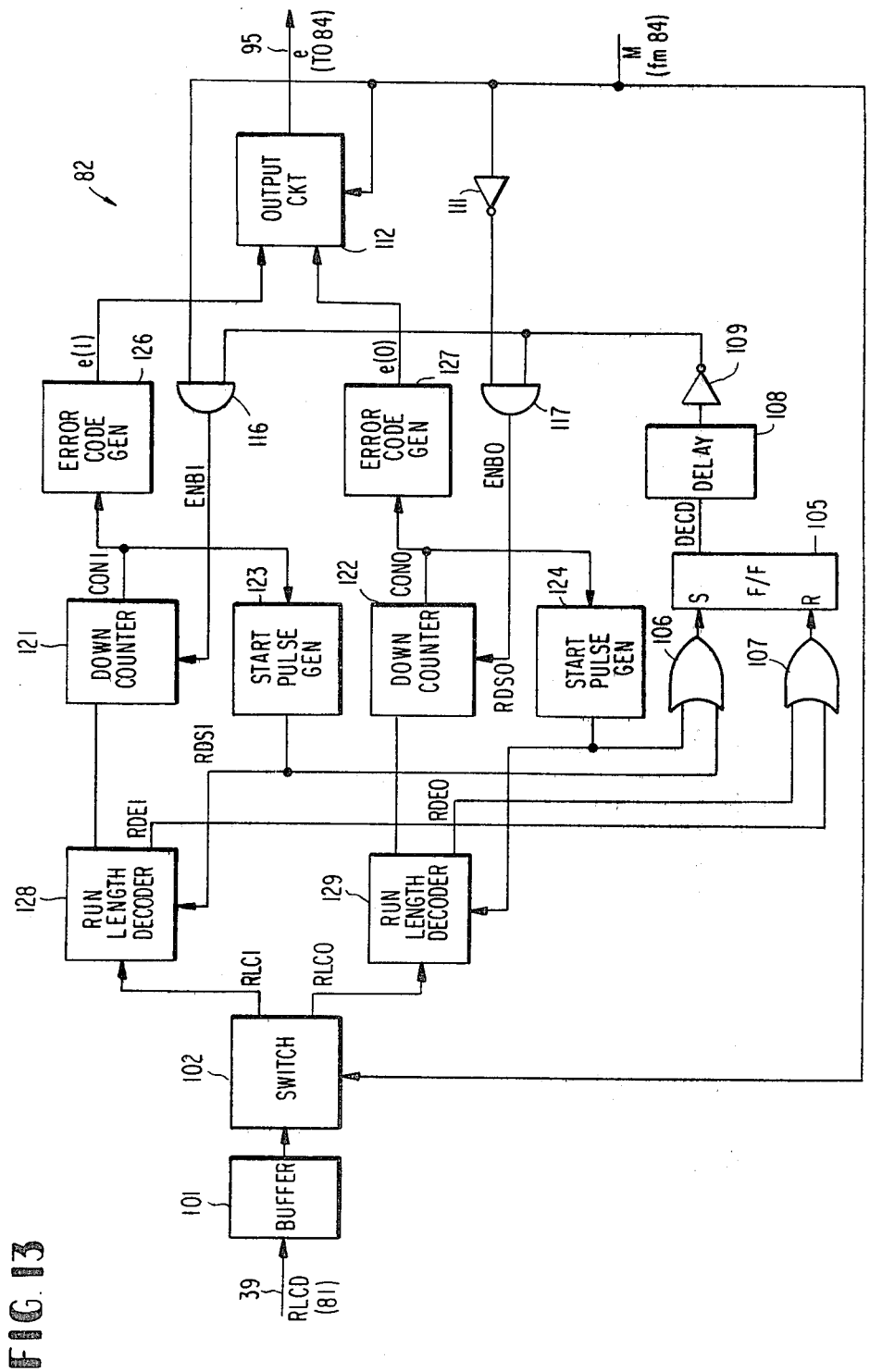
FIG. 13 is a block diagram of a decoding circuit for use in the decoder illustrated in FIG. 11.

Referring to FIG. 13, the decoding circuit 82 is for expansion decoding the input compression encoded signal 81 comprising the run length codes RLCD as described hereinabove. As is the case with the novel run length encoder illustrated with reference to FIGS. 9 and 10, the decoding circuit 82 comprises a first and a second part, similar in structure. In common to the first and the second parts, a buffer memory 101 is for storing the run length codes RLCD. A switching curcit 102 supplies first-kind run length codes RLC1 to the first and second-kind run length codes RLC0 to the second part when the mode codes $M_i$'s supplied from the prediction circuit 84 are high and low, respectively.

A flip-flop 105 is set and reset through set and reset OR gates 106 and 107 as will later be described. When set and reset, the flip-flop 105 gives a decode progress signal DECD a high and a low level, respectively. A delay circuit 108 gives a delay of one clock period of the clock pulses to the decode progress signal DECD. The delayed decode progress signal is inverted by an enable signal inverter 109 into an enable signal ENB.

Supplied with high mode codes directly when the enable signal ENB is high, the first part decodes the first-kind run length codes RLC1 into first-kind prediction error codes $e_i(1)$'s. Supplied with low mode codes through a mode code inverter 111 when the enable signal ENB is high, the second part decodes the second-kind run length codes RLC0 into second-kind prediction error codes $e_i(0)$'s. An output circuit 112 delivers the first-kind and the second-kind prediction error codes $e_i(1)$'s and $e_i(0)$'s to the connection 95 as reproduced prediction error codes $e_i$'s when the reproductions of the mode codes $M_i$'s are high and low, respectively.

The first part comprises a first AND gate 116 enabled when the enable signal ENB is high. Each high mode code passes through the enabled AND gate 116 to become a first enable pulse ENB1. In the second part, a second AND gate 117 is enabled also when the enable signal ENB is high. Each low mode code, after inverted by the mode code inverter 111, passes through the enabled AND gate 117 to become a second enable pulse ENB0. The enable pulses ENB1 and ENB0 are for enabling first and second down counters 121 and 122, respectively. More particularly, each enable pulse ENB1 or ENB0 makes the down counter 121 or 122 count down and produces a first or a second count signal CON1 or CON0 representative of the count therein. The down counters 121 and 122 are put at first in a common initial state of having a count of zero. Under the circumstances, the enable pulses ENB1 and ENB0 make the count signals CON1 and CON0 represent a count of minus unity. Responsive to the count signals CON1 and CON0 representative of minus one, first and second decode start pulse generators 123 and 124 produce first and second decode start pulses RDS1 and RDS0, respectively. The count signals CON1 and CON0 are supplied also to first and second prediction error code generators 126 and 127 which are operative as will later be described.

Responsive to the first decode start pulse RDS1, a first run length decoder 128 begins to decode each first-kind run length code RLC1. A second run length decoder 129 is for likewise decoding each second-kind run length code RLC0. In the meantime, the decode start pulse RDS1 or RDS0 sets the flip-flop 105 through the set OR gate 106 to give the decode progress signal DECD the high level, which level indicates the fact that either the first or the second run length decoder 138 or 129 is decoding the run length code RLC1 or RCL0. Upon completion of decoding, the decoders 128 and 129 produce first and second decode end pulses RDE1 and RDE0, respectively, which reset the flip-flop 105 through the reset OR gate 107 to render the decode progress signal DECD low. Either of the first and the second enable pulses ENB1 and ENB0 is not produced before lapse of one clock period. In the meanwhile, the first decoder 128 sets a count representative of the decoded run length in the first down counter 121. Alternatively, the second decoder 129 sets a similar count in the second down counter 122.

The first and the second count signals CON1 and CON0 are made to represent the decoded run lengths, respectively. If the count signals CON1 and CON0 represent zero, the first and the second prediction error code generators 126 and 127 make the first-kind and the second-kind prediction error codes $e_i(1)$ and $e_i(0)$ have the high (binary "1") level. Otherwise, the first-kind and the second-kind prediction error codes $e_i(1)$ and $e_i(0)$ are made to have the low (binary "0") level. After lapse of the one clock period, the enable signal ENB is rendered high. When the reproduction of the mode code $M_i$ is high, the first enable pulse ENB1 is produced to count down the first down counter 121 and make the first count signal CON1 represent a reduced count. If the reproduction of the mode code $M_i$ is low, the second enable pulse ENB0 is produced to make the second count signal CON0 similarly represent a reduced count. Count down and production of the first-kind prediction error code $e_i(1)$ are repeated in the first part until the first count signal CON1 represents the minus one count when the first decode start pulse RDS1 is again produced to make the first run length decoder 128 begin to decode the next following first-kind run length code RLC1. Likewise, the second run length decoder 129 begins to decode the next following second-kind run length code RLC0 each time when the second count signal CON0 is reduced to represent the minus one count.

Figure 14:
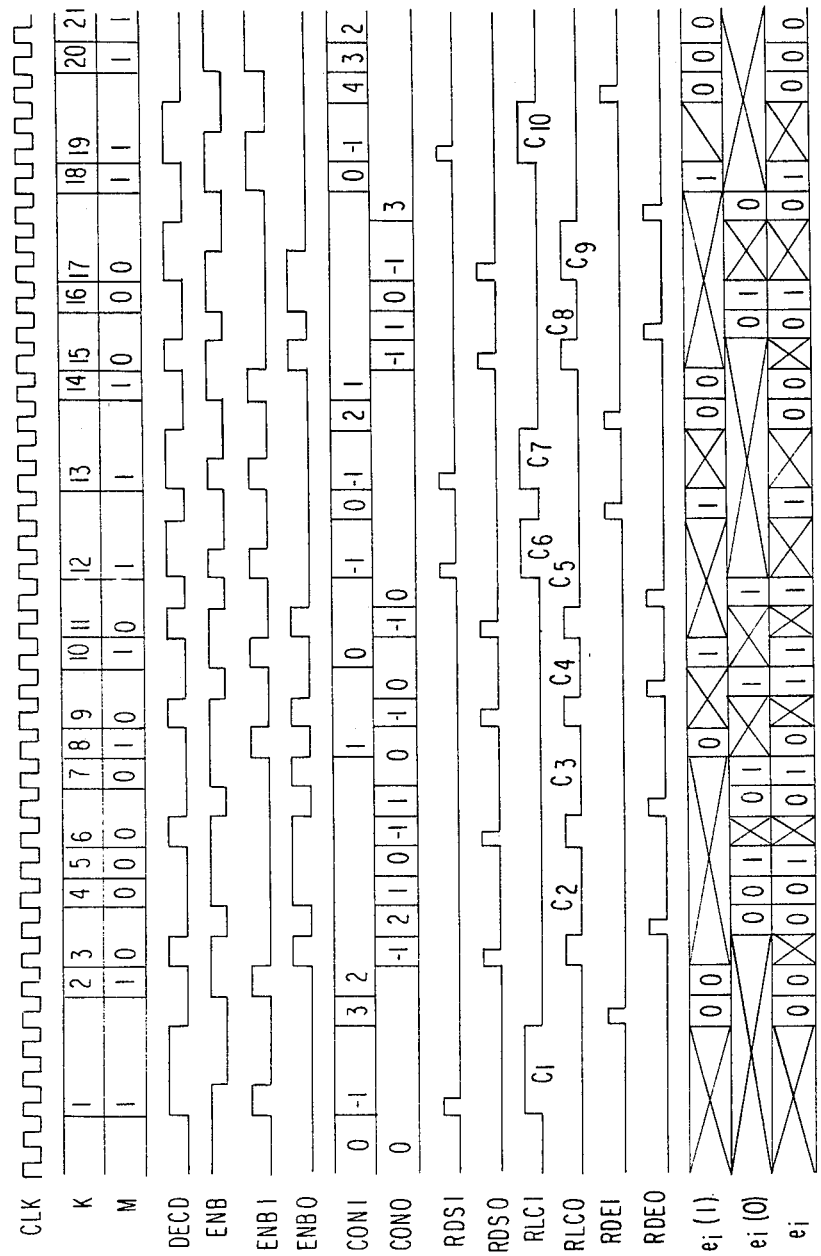
FIG. 14 is a time chart for use in describing operation of the decoder depicted in FIG. 11.

Referring to FIG. 14, it will be presumed merely for clarity of description that the output run length codes RLCD described in conjunction with FIG. 10 are supplied to the decoding circuit 82 illustrated with reference to FIG. 13 as the input compression encoded signal 81. It is also assumed that the runs having started in FIGS. 8 and 10 at K=17 along the first line (solid line) and at K=19 along the second (dashed) line are of three-count and four-count run lengths, respectively, and have resulted in ninth and tenth ones C9 and C10 of the output run length coes RLCD. The clock pulses are depicted at CLK. Serial numbers K are allotted to the respective reproductions of mode codes $M_i$'s according to the order in which they are produced by the prediction circuit 84. During decoding of each first-kind or second-kind run length code RLC1 or RLC0, the prediction error code $e_i(1)$ or $e_i(0)$ is not reproduced. Such durations are indicated by crosses.

At K=1, the decode progress signal DECD is low, the enable signal ENB is high, and the first and the second count signals CON1 and CON0 are representative of zero. Inasmuch as the reproduction of mode code $M_i$ is high (binary "1"), a first enable pulse ENB1 is produced to make the first count signal CON1 represent minus unity. A first decode start pulse RDS1 is produced. The decode progress signal DECD is turned to the high level. The first run length decoder 128 begins to decode a first-kind run length code RLC1, which is the first run length code C1. One clock period after, the enable signal UNB is given the low level to disable both the first and the second down counters 121 and 122 and thereby to prevent the first and the second decode start pulses RDS1 and RDS0 from being produced. When a first decode end pulse RDE1 is eventually produced, the decode progress signal DECD is rendered low. A count representative of the decoded run length of three counts is set in the first down counter 121. Responsive to the first count signal representative of three, the first prediction code generator 126 generates a first-kind prediction error code $e_i(1)$ with the low (binary "0") level given thereto. The low prediction error code is delivered to the connection 95 through the output circuit 112 as a reproduced first prediction error code $e_1$ of a first picture element signal. In the meantime, the second count signal CON0 is kept at the count of zero.

At K=2, the enable signal ENB is turned to the high level. Inasmuch as the reproduction of mode code $M_i$ is again high, another first enable pulse ENB1 is produced. The first down counter 121 is counted down to two to make the first count signal CON1 represent the reduced count of two. The prediction error code generator 126 produces another first-kind prediction error code $e_i(1)$ again giving the low level thereto. The low prediction error code is delivered to the connection 95 as a reproduced second prediction error code $e_2$ of the first picture element signal.

At K=3, no change occurs in the enable signal ENB. The reproduction of mode code $M_i$ is, however, of the low (binary "0") level to become a second enable pulse ENB0 which makes the second count signal CON0 represent minus unity. A second decode start pulse RDS0 is therefore produced to turn the decode progress signal DECD to the high level and to make the second run length decoder 129 begin decoding a second-kind run length code RLC0, which is the second run length code C2 next following the first run length code C1 in the input compression encoded signal 81. A second decode end pulse RCE0 is eventually produced to render the decode progress signal DECD low and to set a count representative of the decoded run length of two counts in the second down counter 122. Responsive to the second count signal CON0 representative of two, the second prediction error code generator 127 produces a second-kind prediction error code $e_i(0)$ with the low level given thereto. The low prediction error code is supplied to the connection 95 through the output circuit 112 as a reproduced third prediction error code $e_3$ of the first picture element signal. In the meantime, the first count signal CON1 is kept at the reduced count of two.

At K=4, the enable signal ENB is turned to the high level. The reproduction of mode code $M_i$ is again high. Another second enable pulse ENB0 is produced to count down the second down counter 122 to a reduced count of unity. The second prediction error code generator 127 produces another second-kind prediction error code $e_i(0)$ with the low level given thereto. The low prediction error code is delivered to the connection 95 as a reproduced first prediction error code $e_1$ for a second picture element signal.

At K=5, no change appears in the enable signal ENB. Inasmuch as the reproduction of mode code $M_i$ is still low, no change occurs also in the second enable pulse ENB0. This merely counts down the second down counter 122. The second count signal CON0 thereby produced is representative of a further reduced count of zero. The prediction error code generator 127 therefore produces still another second-kind prediction error code $e_f(0)$ giving the high (binary "1") level thereto. The high prediction error code is supplied to the connection 95 as a reproduced second prediction error code $e_2$ of the second picture element signal.

At K=6, no change appears both in the enable signal ENB and the second enable pulse ENB0. This merely counts down the second down counter 122. The second count signal CON0 thereby produced represents a still further reduced count of minus unity. The second decode start pulse generator 124 therefore produces a second decode start pulse RDS0 to render the decode progress signal DECD high and to make the second run length decoder 129 begin to decode another second-kind run length code RLC0, which is the third run length code C3. As soon as a second decode end pulse RLE0 is produced, the decode progress signal DECD is rendered low and a count representative of the decoded run length of unity is set in the second down counter 122. Responsive to the second count signal CON0 representative of unity, the second prediction error code generator 127 produces a second-kind prediction error code $e_f(0)$ with the low level given thereto. The low prediction error code is delivered to the connection 95 as a reproduced third prediction error code $e_3$ of the second picture element signal.

At K=7, the enable signal ENB is raised to the high level. The reproduction of mode code $M_i$ is still low. A second enable pulse ENB0 is therefore produced to merely count down the second down counter 122. Responsive to the second count signal CON0 representative of a reduced count of zero, the second prediction error code generator 127 produces a second-kind prediction error code $e_f(0)$ giving the high level thereto. The high prediction error code is supplied to the connection 95 as a reproduced first prediction error code $e_1$ of a third picture element signal.

At K=8, no change appears in the enable signal ENB. The reproduction of mode code $M_i$ is, however, high. A first enable pulse ENB1 is therefore produced to merely count down the first down counter 121. Responsive to the first count signal CON1 thereby produced to represent a further reduced count of unity, the first prediction error code generator 126 produces a first-kind prediction error code $e_f(1)$ with the low level given thereto. The low prediction error code is supplied to the connection 95 as a reproduced second prediction error code $e_2$ of the third picture element signal. The second down counter 122 is kept at the reduced count of zero.

At K=9, no change occurs in the enable signal ENB. The reproduction of mode code $M_i$ is, however, low. A second enable pulse ENB0 is therefore produced to merely count down the second down counter 122. Responsive to the second count signal CON0 thereby produced to represent a further reduced count of minus unity, the second decode start pulse generator 124 generates a second decode start pulse RDS0. With the decode progress signal DECD raised to high, the second run length decoder 129 decodes the fourth run length code C4. When a second decode end pulse RLE0 is produced, the decode progress signal DECD is rendered low with the decoded run length of zero count set in the second down counter 122. The second count signal CON0 thereby produced to represent the set count of zero makes the second prediction error code generator 127 produce a second-kind prediction error code $e_f(0)$ with the high level. The high prediction error code is delivered to the connection 95 as a reproduced third prediction error code $e_3$ of the third picture element signal.

After a similar operation is carried out at K=10 and K=11, the enable signal ENB is turned from low to high at K=12. Inasmuch as the reproduction of mode code $M_i$ is high, a first enable pulse ENB1 is produced to count down the first down counter 121. The first count signal CON1 now represents a further reduced count of minus unity. The first decode start pulse generator 123 therefore generates another first decode start pulse RDS1 to render the decode progress signal DECD high and to make the first run length decoder 128 begin to decode another first-kind run length code RLC1 which is the sixth run length code C6 next subsequent to the fifth run length code C5 being dealt with by the second part. A first decode end pulse RDE1 is produced in due course when the decode progress signal DECD is rendered low with the decoded run length of zero count set in the first down counter 121. The first prediction error code generator 126 generates a first-kind prediction error code $e_f(1)$ giving the high level thereto. The high prediction error code is delivered to the connection 95 as a reproduced third prediction error code $e_3$ for the picture element signal that next follows the picture element signal for which the first through the third prediction error codes $e_1$ to $e_3$ are reproduced at K=7 through 9. The operation for other serial numbers K's will now be self-explanatory.

Figure 15:
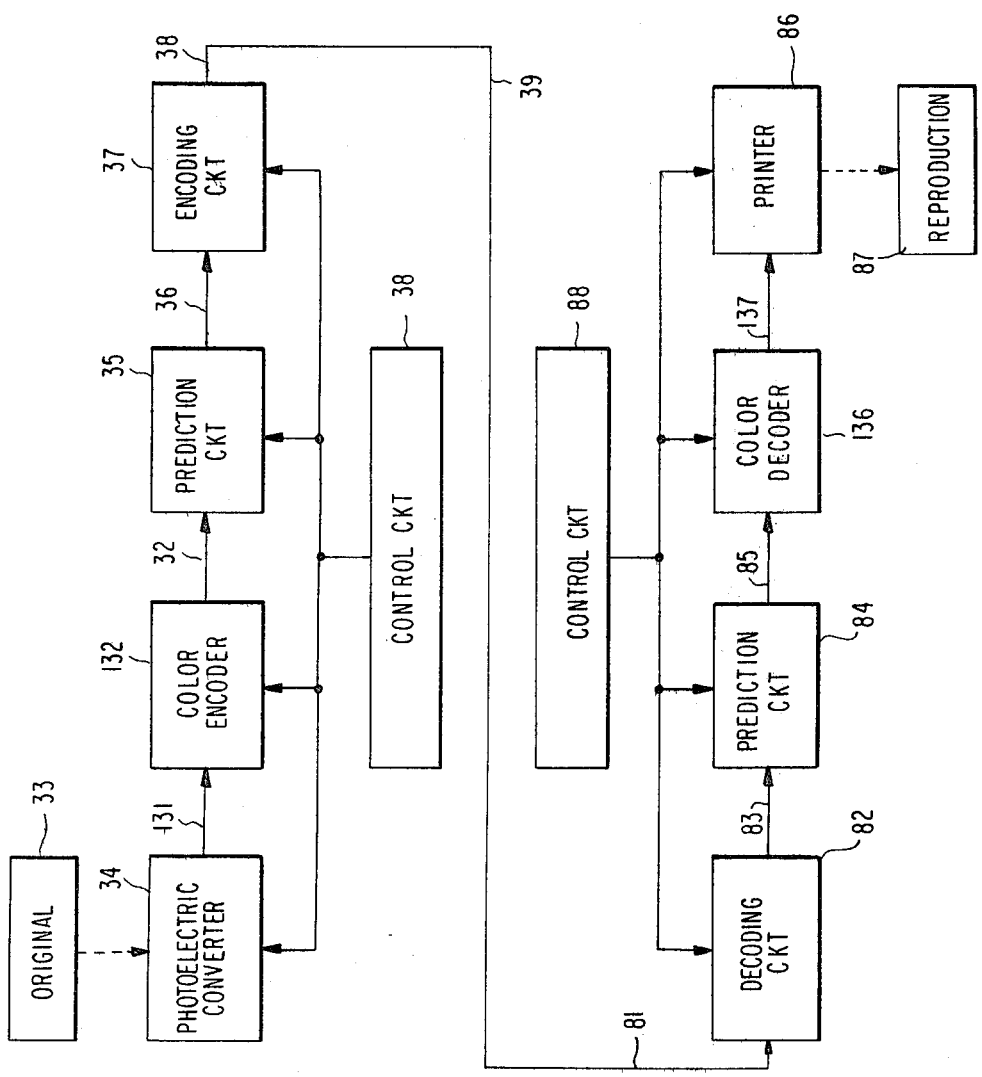
FIG. 15 is a block diagram of an encoder-decoder system according to a second embodiment of this invention.

Turning to FIG. 15, an encoder-decoder system according to a second embodiment of this invention is similar to the system illustrated with reference to FIGS. 1 and 3 through 14 except for the use in encoding a color picture element signal sequence 21 into a compression encoded signal 32 and in expansion decoding the input compression encoded signal 81 into a reproduction of the color picture element signal sequence 85. The photoelectric converter or converters 34 produces a plurality of colored video signal sequences 131 either in parallel or in series. A color encoding circuit 132 encodes the video signal sequences 131 into the color picture element signal sequence 31. When the colors to be encoded are eight in number, it is possible to use a set of color codes listed in Table 22, in which the rightmost column gives decimal numbers represented by the color codes. The color picture element signal sequence 31 is supplied to the prediction circuit 37 of the type described with reference to FIG. 4. Correlation between colors is taken into consideration on predicting each color picture element signal, such as x, because the predicted level x̂, now representative of a color-coded picture element signal, is determined in consideration of the reference signal S. The encoder is similar in other respects to that described with reference to FIGS. 1 and 3 through 10.

TABLE 22

| Black | 000 | 0 |
|---|---|---|
| Red | 001 | 1 |

TABLE 22-continued

| | | |
|---|---|---|
| Orange | 010 | 2 |
| Yellow | 011 | 3 |
| Violet | 100 | 4 |
| Blue | 101 | 5 |
| Green | 110 | 6 |
| White | 111 | 7 |

In FIG. 15, the decoder comprises a color decoder 136 for decoding the reproduced picture element signal sequence 85 into a reproduction of the video signal sequences 137. The color decoder 136 carries out color decoding by the use of Table 22. In other respects, the decoder is similar to that described with reference to FIGS. 11 through 14.

Before continuing the description with reference to the remaining figures of the accompanying drawing, an encoder-decoder system according to a third embodiment of this invention will generally be described. The encoder is for compression encoding a picture element signal sequence variable among a great number of levels N, such as more than eight levels. The picture element signal sequence may be either monochromatic or multicolored. As described hereinabove, let an actual level x of each picture element signal x be predicted as a predicted level $\hat{x}$ by the use of a reference signal S and let a prediction error e be given by subtracting the predicted level x from the actual level x. When the prediction error e is represented by a binary signal, such as the prediction error codes $e_i$'s, the number of bits must be equal to $([\log_2(N-1)]+1)$, where set of brackets represents the Gauss' notation known in mathematics. When the reference signal S consists of four picture element signals a through d, either the ROM 41 for carrying out the nonlinear conversion from the reference signal S to the predicted level $\hat{x}$ or the ROM 44 for producing the level signals $h_k$'s in response to the reference signal S must have input addresses, $4([\log_2(N-1)]+1)$ in number. Each address must produce an output signal $\hat{x}$ or $h_k$ consisting of a plurality of bits, $([\log_2(N-1)]+1)$ in number. If the number of levels N is sixty-four, each picture element signal x or any one of a through d is represented by six binary bits. The ROM 41 or 44 must therefore have 4×6 or twenty-four input addresses with each address made to produce a six-bit binary signal. When the ROW 41 or 44 is composed of ten-bit address and three-bit output elementary ROM's, the number of elementary ROM's amounts to $2^{24-10} \times 2^{6-3}$, namely, $2^{17}$ or 131,072. The decoder must also comprise this great number of elementary ROM's. The encoder and the decoder become considerably bulky.

Prediction of each actual level x is therefore carried out stepwise in a plurality of steps. For example, let the actual level x one of sixty-four levels 0 through 63 and predicted in a first step and then in a second step. For this purpose, each actual level x is classified into zeroth through seventh first-step ranges $x_{1(0)}$ to $x_{1(7)}$, such as from the level 0 to the level 7, from the level 8 to the level 15, . . . , and from the level 56 to the level 63. In each first-step range $x_{1(p)}$, where p represents each of 0 through 7, the actual level x is classified into zeroth through seventh second-step ranges $x_{2(p0)}$ to $x_{2(p7)}$, which are now the individual levels $8p$, $8p+1$, . . . , and $8p+7$. In the first step of prediction, the actual level x is roughly predicted to be in one of the eight first-step ranges $x_{1(p)}$'s depending on the reference signal S. Once so predicted, it is possible in the second step of prediction of finely or minutely predict the actual level x as one of the second-step ranges, namely, as a certain predicted level $\hat{x}$, again conditioned by the reference signal S. The first-step ranges $x_{1(0)}$ through $x_{1(7)}$ are designated by an eight-level first-step signal $x_1$ and the second-step ranges $x_{2(00)}$ to $x_{2(07)}$, $x_{2(10)}$ to $x_{2(17)}$, . . . , and $x_{2(70)}$ to $x_{2(77)}$ as listed in Table 23.

TABLE 23

| x | $x_1$ | $x_2$ | x | $x_1$ | $x_2$ |
|---|---|---|---|---|---|
| 0 | | 0 | | | |
| 1 | | 1 | | | |
| 2 | | 2 | | | |
| 3 | 0 | 3 | | | |
| 4 | | 4 | | | |
| 5 | | 5 | | | |
| 6 | | 6 | | | |
| 7 | | 7 | | | |
| 8 | | 0 | 56 | | 0 |
| 9 | | 1 | 57 | | 1 |
| 10 | | 2 | 58 | | 2 |
| 11 | 1 | 3 | 59 | 7 | 3 |
| 12 | | 4 | 60 | | 4 |
| 13 | | 5 | 61 | | 5 |
| 14 | | 6 | 62 | | 6 |
| 15 | | 7 | 63 | | 7 |

It is, however, impractical to carry out the first step of prediction by directly using the reference signal S. This is because the ROM used therefor must have input addresses 4×6 or twenty-four bits even when the reference signal S consists of only four neighboring picture elements a through d described hereinabove. Incidentally, each picture element signal x to be predicted is represented by the first-step signal $x_1$ and one of the second-step signal $x_2$'s. It is now possible to understand that the picture element signal x is decomposed into a first decomposed picture element signal $x_1$ and one of zeroth through seventh ones of second decomposed picture element signals $x_2$'s or $x_{20}$ to $x_{27}$. Merely for convenience, the picture element signal x will be deemed as a zeroth decomposed picture element signal $x_0$.

Each picture element signal y of the reference signal S is therefore transformed into a first transformed picture element signal $y_1$. In order to use an eight-bit binary signal, each level y is grouped into zeroth through seventh first-step groups of levels $y_{1(0)}$ to $y_{1(7)}$ by the use of first through seventh first-step threshold levels $T_1$'s or $T_{11}$ to $T_{17}$. Preferably, the threshold levels $T_1$'s are the levels 8, 16, 24, 30, 40, 48, and 56 so that a q-th group of levels $y_{1(q)}$, where q represents each of 1 through 7, corresponds to the p-th first-step range $x_{1(p)}$ and consists of the levels $8q$, $8q+1$, . . . , and $8q+7$ as listed in the two leftmost columns in Table 24. With this, the reference signal S is roughly given by a first transformed reference signal $S_1$ (the same reference symbol being used as the first reference signal $S_1$ described hereinabove, which will now be denoted by $S_{(1)}$) consisting of first transformed picture element signals $a_1$ through $d_1$. The first step of prediction is now carried out by the use of an ROM having input addresses of 4×3 or twelve bits so as to predict the actual level x to be in one of the eight first-step ranges $x_{1(p)}$'s by the use of the first-step transformed reference signal $S_1$. The picture element signal y may be referred to as a zeroth transformed picture element signal $y_0$.

TABLE 24

| y | $y_1$ | $x_1 = 0$ | $x_1 = 1$ | $y_2$ ... | $x_1 = 7$ |
|---|---|---|---|---|---|
| 0 |   | 0 | 0 |   | 0 |
| 1 |   | 1 | 0 |   | 0 |
| 2 |   | 2 | 0 |   | 0 |
| 3 | 0 | 3 | 0 |   | 0 |
| 4 |   | 4 | 0 |   | 0 |
| 5 |   | 5 | 0 |   | 0 |
| 6 |   | 6 | 0 |   | 0 |
| 7 |   | 7 | 0 |   | 0 |
| 8 |   | 7 | 0 |   | 0 |
| 9 |   | 7 | 1 |   | 0 |
| 10 |   | 7 | 2 |   | 0 |
| 11 | 1 | 7 | 3 |   | 0 |
| 12 |   | 7 | 4 |   | 0 |
| 13 |   | 7 | 5 |   | 0 |
| 14 |   | 7 | 6 |   | 0 |
| 15 |   | 7 | 7 |   | 0 |
| . |   | . |   |   |   |
| 56 |   | 7 | 7 |   | 0 |
| 57 |   | 7 | 7 |   | 1 |
| 58 |   | 7 | 7 |   | 2 |
| 59 | 7 | 7 | 7 |   | 3 |
| 60 |   | 7 | 7 |   | 4 |
| 61 |   | 7 | 7 |   | 5 |
| 62 |   | 7 | 7 |   | 6 |
| 63 |   | 7 | 7 |   | 7 |

It is also impractical to carry out the second step of prediction by directly using either the reference signal S of a (4×6)-bit binary signal or the first transformed reference signal $S_1$ although the latter is a twelve-bit binary signal. Each first-step of level group $y_{1(q)}$ is therefore divided into zeroth through seventh second-step groups of levels $y_{2(q0)}$ to $y_{2(q7)}$, which may be represented by a q-th one of zeroth through seventh second eight-level transformed picture element signals $y_2$'s or $y_{20}$ to $y_{27}$. The division is carried out by the use of first through seventh second-step threshold levels $T_2$'s or $T_{21}$ to $T_{27}$. It is possible to transform the picture element signal y directly to one of the second transformed picture element signals $y_2$'s by rendering the second-step threshold levels $T_2$'s depentent on the serial number q of the first-step level group $y_{1(q)}$ under consideration. Such second-step threshold levels $T_2$'s for the q-th first level group $y_{1(q)}$ may be the levels $8q+1$, $8q+2$, ..., and $8q+7$. Under the circumstances, the second-step level groups $y_{2(q0)}$ through $y_{2(q7)}$ are now the individual levels $8q$, $8q+1$, ..., and $8q+7$. With this, the reference signal S is finely or minutely given by the first transformed reference signal $S_1$ and one of zeroth through seventh ones of second transformed reference signals $S_2$'s or $S_{20}$ to $S_{27}$, each of which consists of the second transformed picture element signals $a_2$ through $d_2$. Inasmuch as the first-step level groups $y_{1(q)}$'s are now in one-to-one correspondence to the first-step ranges $y_{1(p)}$'s, it is possible to decide the second-step threshold levels $T_2$'s with reference to the first decomposed picture element signal $x_1$. In this event, the second-step transformed picture element signals $y_2$'s become as listed in the third and the following columns of Table 24. It is also possible to decompose the zeroth decomposed picture element signal $x_0$ into the first decomposed picture element signal $x_1$ by the use of the first-step threshold levels $T_1$'s and directly into that one of the second decomposed picture element signals $x_2$'s by the use of the second-step threshold levels $T_2$'s which is to be combined with the first decomposed picture element signal $x_1$. It is now feasible to use an ROM having 4×3 or twelve input addresses and three-bit outputs on carrying out the second step of prediction. When an elementary ROM has ten-bit addresses and three-bit outputs, the number of elementary ROM's for the first and the second steps of prediction is only $2^{12-10} \times 2$ or eight.

Figure 16:
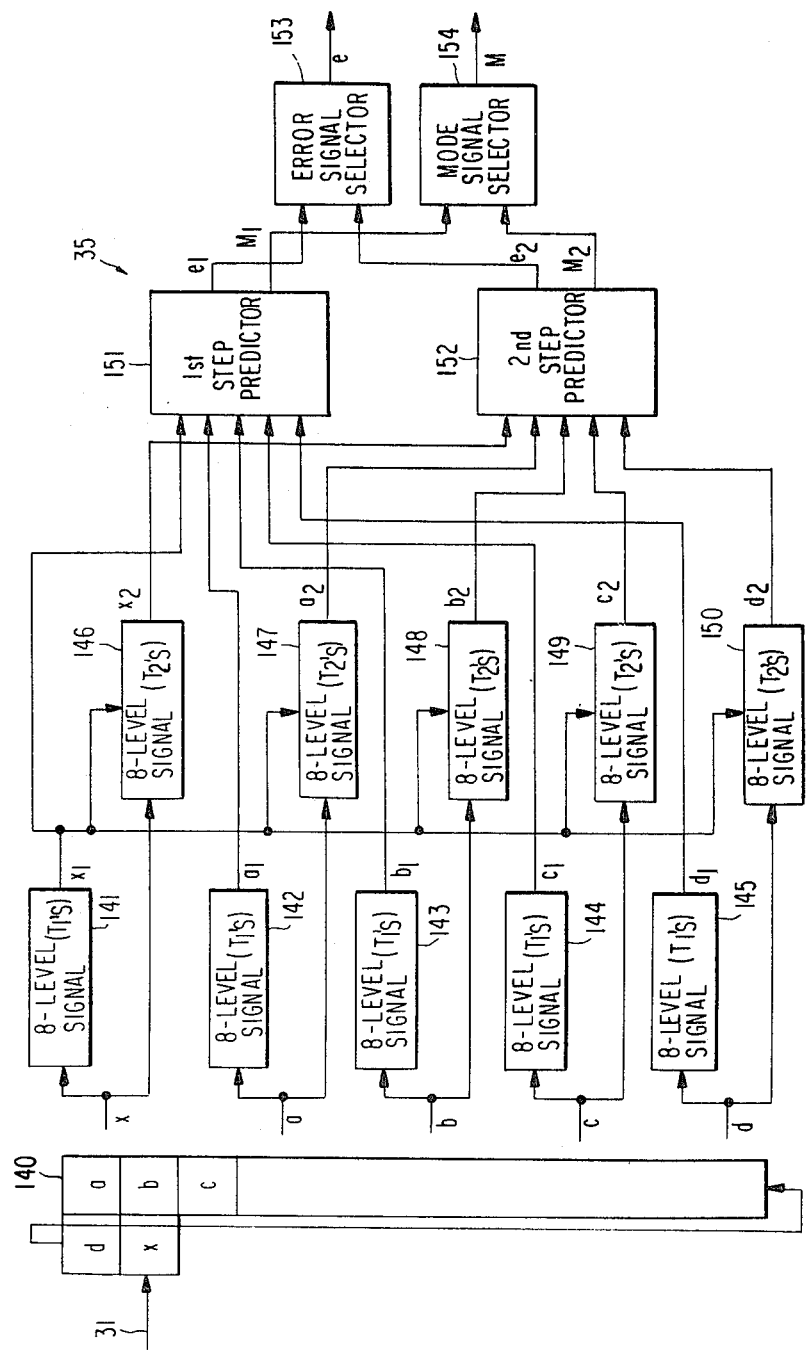
FIG. 16 is a block diagram of a prediction circuit for use according to a third embodiment of this invention in an encoder of the type illustrated in FIG. 1.

Referring now to FIG. 16, a prediction circuit 35 (FIG. 1 or 15) for carrying out prediction of the actual level x of each picture element signal x according to the first and the second steps described hereinabove, comprises a 6(R+2)-bit shift register 140 for storing that portion of the picture element signal sequence 31 at a time which comprises the picture element signal x to be predicted and the picture element signals y's or a through d of the reference signal S for that picture element signal x. First through fifth first-step eight-level signal producing circuits 141, 142, 143, 144, and 145, each having the first through the seventh first-step threshold levels $T_1$'s of the levels 8, 16, ..., and 56 are responsive to the picture element signals x and y's, respectively, for producing first-step eight-level signals or the first decomposed picture element signal $x_1$ and the first transformed picture element signals $a_1$ through $d_1$. First through fifth second-step eight-level signal producing circuits 146, 147, 148, 149, and 150, each retaining the first through the seventh second-step threshold levels $T_2$'s controlled by a control signal given by the first decomposed picture element signal $x_1$, are responsive directly to the picture element signals x and y's, respectively, for producing second-step eight-level signals or that one of the second decomposed picture element signals $x_2$'s and those of the second transformed picture element signals $y_2$'s for the picture element signals a through d which are in the first-step range and the first-step level groups specified by the first decomposed picture element signal $x_1$.

As will presently be described more in detail, a first-step predictor 151 is supplied with the first-step signals $x_1$ and $a_1$ through $d_1$ and produces a first eight-level or three-bit prediction error signal $e_1$ representative of one of the first-step ranges $x_{1(0)}$ through $x_{1(7)}$. Responsive to the second-step signals $x_2$ and $a_2$ through $d_2$, a second-step predictor 152 produces a similar second prediction error signal $e_2$ representative of that one of the second-step ranges $x_{2(p0)}$ to $x_{2(p7)}$ which is to be combined with a specific first-step range $x_{1(p)}$ specified by the first decomposed picture element signal $x_1$, namely, represented by the first prediction error signal $e_1$. The predictors 151 and 152 are also for producing a first mode signal $M_1$ and a second mode signal $M_2$. Although similarly named and denoted by like reference symbols, the prediction error signals $e_1$ and $e_2$ and the mode signals $M_1$ and $M_2$ being referred to are somewhat different from those described in conjunction with FIGS. 1 and 3 through 10 or 11 through 14. An error signal selector 153 is for merely time sequentially arranging the first and then the second prediction error signals $e_1$ and $e_2$ into a sequence e of prediction error signals $e_1$ and $e_2$ for the picture element signal x in question, $e_1$ and $e_2$ for a picture element signal to be next subsequently predicted, and so forth. A mode signal selector 154 is for similarly producing a sequence M of mode signals $M_1$, $M_2$, $M_1$, $M_2$, and so on in synchronism with the respective prediction error signals $e_1$, $e_2$, $e_1$, $e_2$, and others.

Figure 17:
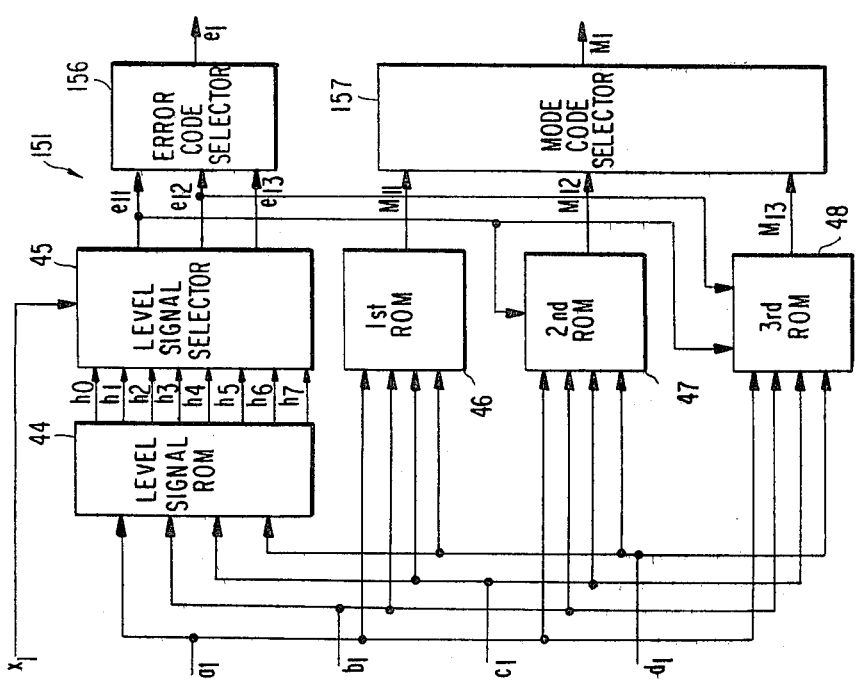
FIG. 17, depicted next to FIG. 15, is a block diagram of a portion of the prediction circuit shown in FIG. 16.

Turning to FIG. 17, the first-step predictor 151 is similar in structure to the novel prediction circuit illustrated with reference to FIG. 4. The 3(R+2)-bit shift register 42, now the 6(R+2)-bit shift register, is comprised by the whole prediction circuit 35 as indicated at 140. Other similar parts are designated by like reference numerals.

The level signal producing ROM 44 is supplied with the first transformed picture element signals $a_1$ through $d_1$. The level signals $h_k$'s or $h_0$ through $h_7$ are representative of the first-step ranges $x_{1(0)}$ through $x_{1(7)}$, respectively. The first probability described hereinabove is now called a first-step probability and denoted by $P(x_1|S_j)$ for the reason that will become clear as the description proceeds. The level signals $h_k$'s are produced as described with reference to Tables 5 and 6. The level signal selector 45 is supplied with the first decomposed picture element signal $x_1$ and selects the level signal $h_{(k,x1)}$ of the level best coincident with the first-step range in which the actual level x is present. The level signal selector 45 produces first through third first-step prediction error codes $e_{11}$ to $e_{13}$ which are representative of a first eight-level prediction error or three-bit binary serial number $e_1$ representative of the suffix $(k,x_1)$ to the selected level signal $h_{(k,x1)}$. With this, the first-step prediction error codes $e_{11}$ through $e_{13}$ are given the features described with reference to Tables 8 through 10. An error code selector 156 time sequentially arranges the first-step prediction error codes $e_{11}$, $e_{12}$, and $e_{13}$ into the first prediction error signal $e_1$.

The first through the third ROM's 46 to 48 are supplied with only the first transformed picture element signals $a_1$ to $d_1$, the signals $a_1$ to $d_1$ and the first first-step prediction error code $e_{11}$, and the signals $a_1$ to $d_1$ and the first and the second first-step prediction error codes $e_{11}$ and $e_{12}$, respectively. The ROM's 46 to 48 are for producing first through third first-step mode codes $M_{11}$ to $M_{13}$. A mode code selector 157 is for time sequentially arranging the mode codes $M_{11}$, $M_{12}$, and $M_{13}$ into the first mode signal $M_1$ in synchronism with the first-step prediction error codes $e_{11}$ through $e_{13}$, respectively, so that the mode codes $M_{11}$ through $M_{13}$ are allotted to the respective first-step prediction error codes $e_{11}$ to $e_{13}$. The modified conditional probabilities are now named first-step modified conditional probabilities and designated by $P(e_{11}|S_j)$, $P(e_{12}|S_j, e_{11})$, and $P(e_{13}|S_j, e_{11}, e_{12})$. The second probabilities are called first-step second probabilities and represented by $P(O|S_j)$, $p(O|S_j, e_{11})$, and $P(O|S_j, e_{11}, e_{12})$. The facts described hereinabove with reference to Tables 11 through 20 and FIGS. 5 and 6 apply to the first-step modified conditional probabilities and the first-step second probabilities.

The second predictor 152 is similar to the first predictor 151. The selected level signal $h_{(k,x2)}$ now has a level best coincident with the actual level $\hat{x}$. The second predictor 152 produces first through third second-step prediction error codes $e_{21}$ to $e_{23}$ and first through third second-step mode codes $M_{21}$ to $M_{23}$. In cooperation with the first-step prediction error codes $e_{11}$ through $e_{13}$, the second-step prediction error codes $e_{21}$ through $e_{23}$ finely represent an overall prediction error e between the actual level x and the predicted level x. The second-step mode codes $M_{21}$ through $M_{23}$ are allotted to the respective second-step prediction error codes $e_{21}$ through $e_{23}$. The first probability is now called a first second-step probability and the modified conditional and the second probabilities, second-step modified conditional and second probabilities. The facts described in conjunction with Tables 11 through 20 and FIGS. 5 and 6 apply to the second-step modified conditional probabilities and the second-step second probabilities.

Figure 18:
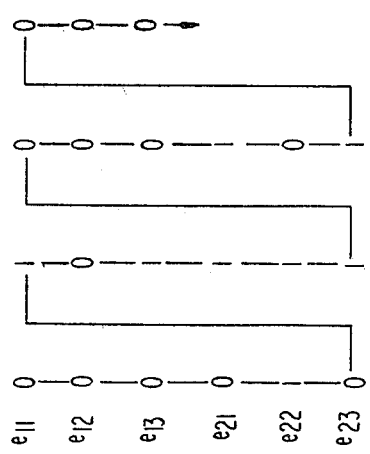
FIG. 18 shows another sequence in which the prediction error codes are subjected to run length encoding.

Referring to FIG. 18, it is possible to make the conventional one-dimensional run length encoder encode the prediction error signal sequence e as illustrated with reference to FIG. 7. In FIG. 18, the first through the third first-step prediction error codes $e_{11}$ to $e_{13}$ roughly representative of the overall prediction error e for a picture element signal x being predicted, the first through the third second-step prediction error codes $e_{21}$ to $e_{23}$ for the picture element signal x in question, the first through the third first-step prediction error codes $e_{11}$ to $e_{13}$ for a next following picture element signal, the first through the third second-step prediction error codes $e_{21}$ to $e_{23}$ for the last-mentioned picture element signal, and so forth, are merely time sequentially concatenated. Data compression is again possible as explained in conjunction with FIG. 7.

Figure 19:
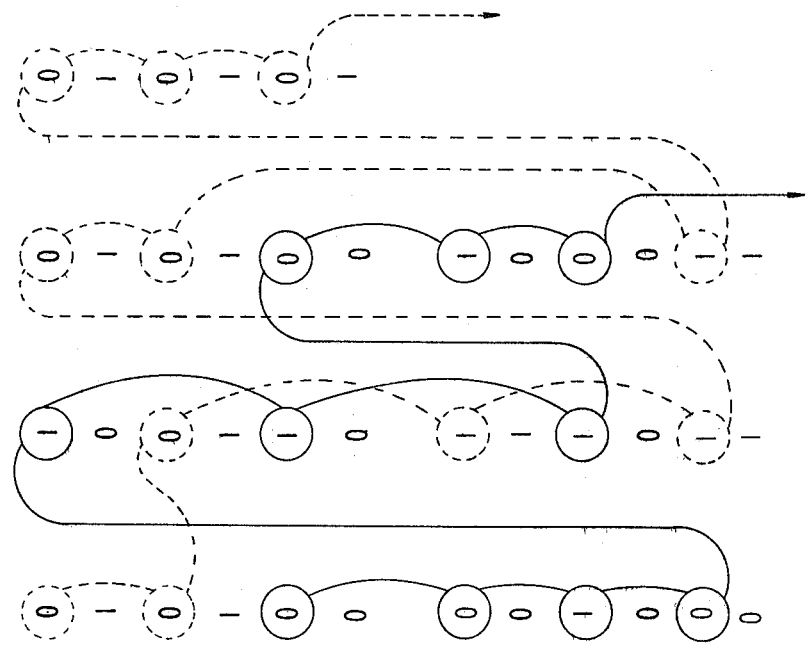
FIG. 19 shows two sequences in which the prediction error codes are subjected to run length encoding with the mode codes taken into consideration.

Turning to FIG. 19, the prediction error codes $e_{11}$ through $e_{13}$ and $e_{21}$ through $e_{23}$ for a picture element signal x, the prediction error codes $e_{11}$ through $e_{13}$ and $e_{21}$ through $e_{23}$ for a next subsequent picture element signal, and the like prediction error codes for the successive picture element signals are grouped into a first and a second sequence as indicated by a first (dashed) and a second (solid) generally curved line when the mode codes $M_{11}$ through $M_{13}$ and $M_{21}$ through $M_{23}$, $M_{11}$ through $M_{23}$, and so forth allotted to the respective prediction error codes $e_{11}$ to $e_{13}$ and $e_{21}$ to $e_{23}$, $e_{11}$ to $e_{13}$ and $e_{21}$ to $e_{23}$, and others are of the binary "1" and "0" levels, respectively. It is to be noted here that the first and the second lines as now called are the second and the first lines described in conjunction with FIG. 8, respectively. The instant 77 is also indicated.

Figure 20:
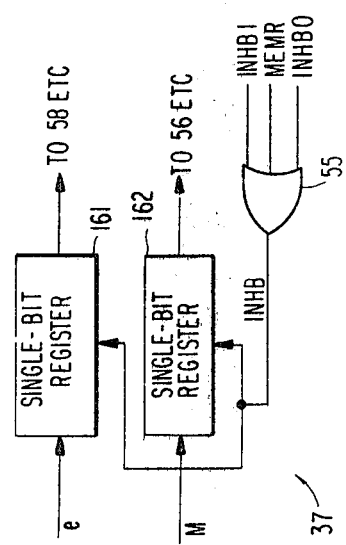
FIG. 20, drawn below

Referring now to FIG. 20, a novel run length encoder is similar to that illustrated with reference to FIGS. 9 and 10. Instead of the three-bit registers 51 and 52 accompanied by the selectors 53 and 54, a single-bit prediction error code register 161 carries out the grouping of the prediction error codes $e_{11}$ through $e_{13}$ and $e_{21}$ through $e_{23}$, $e_{11}$ through $e_{13}$ and $e_{21}$ through $e_{23}$, and so on into the first and second sequences in cooperation with a single-bit mode code register 162 and the inhibit signal OR gate 55 among others. The encoder only partly depicted in FIG. 20 is operable substantially as described with reference to FIG. 10 and Table 21. The single-bit registers 161 and 162 are used because the prediction circuit 35 already comprises the error and the mode signal selectors 153 and 154 as described in conjunction with FIG. 16.

Figure 21:
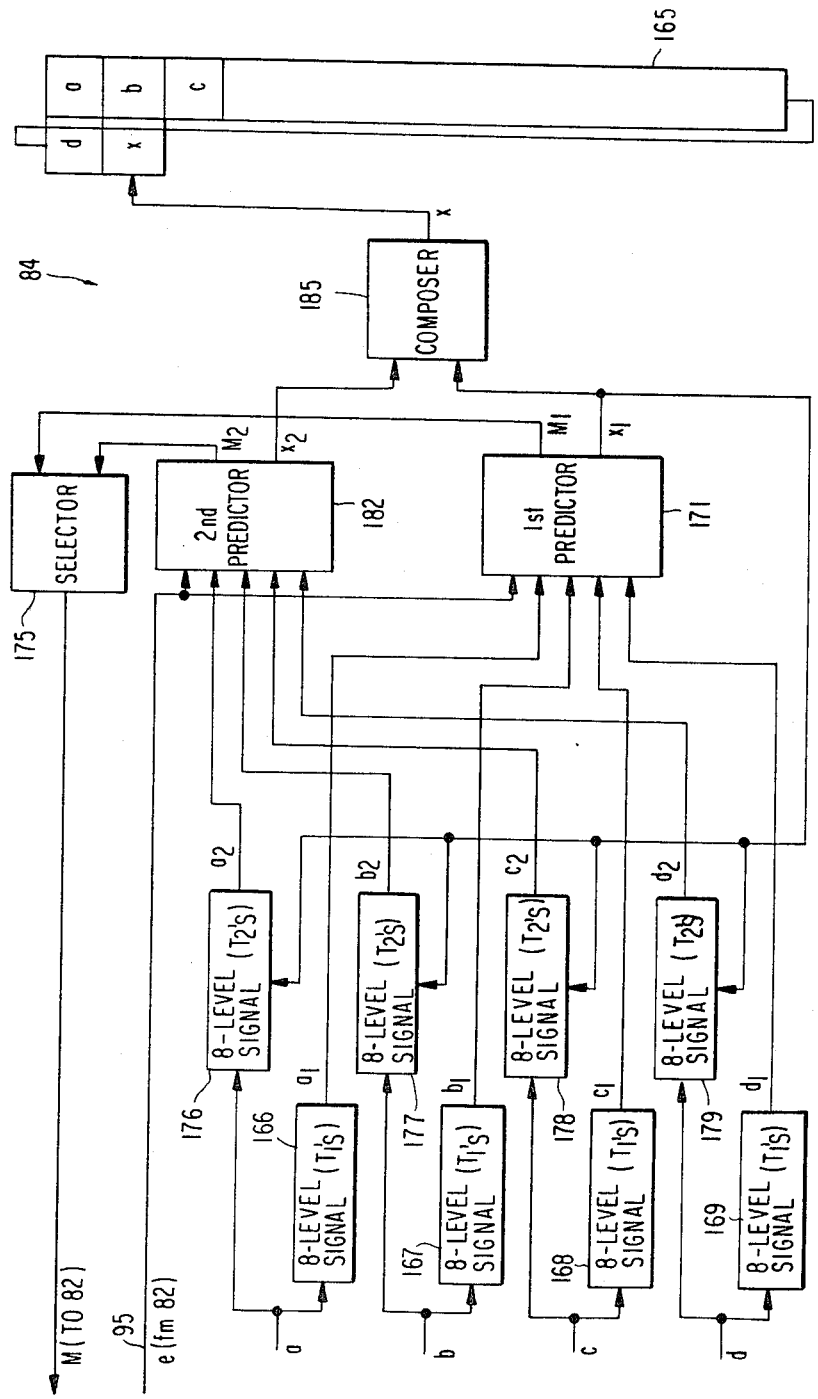
FIG. 21 is a block diagram of a prediction circuit for use in combination with the prediction circuit depicted in FIG. 16 in a decoder of the type shown in FIG. 1.

Turning to FIG. 21, a prediction circuit 84 (FIG. 11 or 15) for use in a decoder to be coupled with the encoder comprising the prediction circuit 35 is illustrated with reference to FIGS. 16 and 17. The prediction circuit 84 successively supplies a sequence of reproductions of the first through the third first-step mode codes $M_{11}$ to $M_{13}$ and the first through the third second-step mode codes $M_{21}$ to $M_{23}$ for a picture element signal to be reproduced, the first through the third first-step mode codes $M_{11}$ to $M_{13}$ and the first through the third second-step mode codes $M_{21}$ to $M_{23}$ for the picture element signal to be next subsequently reproduced, and the like mode codes for the successive picture element signals to be reproduced, to the expansion decoding circuit 82, which is of the structure depicted in FIG. 13 and operable as described with reference to FIG. 14. More particularly, the expansion decoding circuit 82 now reproduces a sequence of the first through the third first-step prediction error codes $e_{11}$ to $e_{13}$ and the first through the third second-step prediction error codes $e_{21}$ to $e_{23}$ for the picture element signal being reproduced, the first through the third first-step prediction error codes $e_{11}$ to $e_{13}$ and the first through the third second-step prediction error codes $e_{21}$ to $e_{23}$ for the next subsequently reproduced picture element signal, and so forth.

With the mode codes M's and the prediction error codes e's alternatingly reproduced as described hereinabove with reference to FIGS. 12 through 14, the prediction circuit 84 successively reproduces picture element signals of a sequence 85 and stores a predetermined portion of the sequence 85 in a 6(R+2)-bit shift register 165. First through fourth first-step eight-level signal producing circuits 166, 167, 168, and 169 retains the first-step threshold levels $T_1$'s. Responsive to the reproduced picture element signals y's or a through d of a reproduced reference signal S stored in the shift register 165 for a picture element signal x being predicted, the circuits 166 through 169 produce first transformed picture element signals $a_1$ through $d_1$, respectively.

A first predictor 171 is of the structure illustrated in FIG. 12 except for the 3(R+2)-bit shift register 90 which is now comprised as the 6(R+2)-bit shift register 165 by the whole prediction circuit 84. As described with reference to FIG. 14, the predictor 171 reproduces a first first-step mode code $M_{11}$ in response to the first transformed picture element signals y's. The reproduction of the mode code $M_{11}$ is supplied to the expansion decoding circuit 82 through a selector 175 controlled by the control circuit 88. The expansion decoding circuit 82 reproduces a first first-step prediction error code $e_{11}$ of the picture element signal x and supplies the same to the predictor 171 through the connection 95. Responsive to the first transformed picture element signals y's and the reproduced first first-step prediction error code $e_{11}$, the predictor 171 produces a reproduction of the second first-step mode code $M_{12}$ which is again sent to the expansion decoding circuit 82 through the selector 175. In this manner, the predictor 171 reproduces the first through the third first-step prediction error codes $e_{11}$ to $e_{13}$ and the first decomposed picture element signal $x_1$.

First through fourth second-step eight-level signal producing circuits 176, 177, 178, and 179 hold the second-step threshold levels $T_2$'s controlled by the first decomposed picture element signal $x_1$. Responsive to the reproduced picture element signals a through d, the second-step eight-level signal producing circuits 176 through 179 produce second transformed picture element signals $a_2$ through $d_2$, respectively. A second predictor 182 is similar to the first predictor 171. Supplied with the second transformed picture element signals $y_2$'s, the second predictor 182 produces a reproduction of first second-step mode code $M_{21}$ of the picture element signal x, of which the first decomposed picture element signal $x_1$ is already reproduced as described hereinabove and used to control the second-step threshold levels $T_2$'s. The selector 175 supplies the reproduction of the first second-step mode code $M_{21}$ to the expansion decoding circuit 82. In cooperation with the expansion decoding circuit 82, the second predictor 182 successively reproduces the second and the third second-step mode codes $M_{22}$ and $M_{23}$ and the second decomposed picture element signal $x_2$.

As described hereinabove, the first decomposed picture element signal $x_1$ is a three-bit binary signal representative of eight more significant bits of the picture element signal x under consideration and the second decomposed picture element signal $x_2$, another three-bit binary signal giving eight less significant bits of the picture element signal x in question. A composer 185 therefore arranges the first and the second decomposed picture element signals $x_1$ and $x_2$ into the six-bit sixty-four-level picture element signal x. As soon as the predicted and composed picture element signal x is supplied to the shift register 165, the control circuit 88 shifts the picture element signals a through d and x by one shift stage.

Turning back to the general description given heretobefore as regards the encoder-decoder system according to the third embodiment of this invention, it is possible to decompose in three steps the zeroth decomposed picture element signal $x_0$ capable of taking one of a great number N of individual levels into a first decomposed picture element signal $x_0$ representative of a first plurality $N_1$ of first-step levels or first-step ranges, one of second decomposed picture element signals $x_2$'s, each representative of a second plurality $N_2$ of second-step levels, and one of third decomposed picture element signals $x_3$'s, each representative of those third plurality $N_3$ of third-step levels which are in one-to-one correspondence to a plurality of individual levels, the third plurality $N_3$ in number. The first plurality $N_1$ may be eight. When the number N of individual levels is sixty-four, the second and the third pluralities $N_2$ and $N_3$ may be either and the other of four and two, respectively. Alternatively, each of the first through the third pluralities $N_1$ to $N_3$ may be four. It is readily understood that a product of the first through the third pluralities $N_1$ to $N_3$ should be equal to the number N of individual levels when the number N is thus divisible. When prediction is thus carried out in three steps, the zeroth transformed picture element signal $y_0$ is transformed into a first transformed picture element signal $y_1$ representative of the first-step levels and one each of second and third transformed picture element signals $y_2$ and $y_3$ representative of the second-step and the third-step levels, respectively. As a further alternative, prediction may be carried out again in two steps but with sixteen and four selected as the first and the second pluralities $N_1$ and $N_2$, respectively.

When the picture element signal x or y variable among sixty-four levels 0 through 63 is thus decomposed or transformed in three steps into three four-level picture element signals, first-step threshold levels $T_1$'s are preferably the levels 16, 32, and 48, three in number. A first decomposed picture element signal $x_1$ is variable among four first-step levels, such as 0, 1, 2, and 3, representative of zeroth through third first-step ranges, respectively. The zeroth first-step range is from the level 0 to the level 15. The first first-step range is from the level 16 to the level 31. The second first-step range is from the level 32 to the level 47. The third first-step range is from the level 48 to the level 63. A first transformed picture element signal $y_1$ is also variable among the four first-step levels, which now represent zeroth through third first-step level groups corresponding to the zeroth through the third first-step ranges, respectively, as shown in FIG. 22 at 186. One of the first-step levels is predicted for the picture element signal x under consideration by a first transformed reference signal $S_1$ consisting of the first transformed picture element signals $y_1$'s, such as $a_1$ through $d_1$.

Second-step threshold levels $T_2$'s are controlled by the first decomposed picture element signal $x_1$. When the signal $x_1$ takes the first-step level 0, the threshold levels $T_2$'s are the levels 4, 8, and 12. When the signal $x_1$ takes the first-step level 1, the threshold levels $T_2$'s are the levels 20, 24, and 28. When the signal $x_1$ takes the first-step level 2, the threshold levels $T_2$'s are the levels 36, 40, and 44. When the signal $x_1$ takes the first-step level 3, the threshold levels $T_2$'s are the levels 52, 56, and 60. A second decomposed picture element signal $x_2$ is variable among four second-step levels, such as 0 through 3, representative of zeroth through third second-step ranges, respectively. When the first decomposed picture element signal $x_1$ has the first-step level 0, the zeroth to the third second-step ranges are from the level 0 to the level 3, from the level 4 to the level 7, from the level 8 to the level 11, and from the level 12 to the level 15. Together with this second-step range, other second-step ranges are listed in the three left columns of Table 25. A second transformed picture element signal $y_2$ is also variable among the four second-step levels which are now representative of zeroth through third second-step level groups as shown in FIG. 22 at 187. One of the second-stage levels is predicted in the first-step range represented by the predicted first-step level by a second transformed reference signal $S_2$ consisting of the second transformed picture element signals $y_2$'s, such as $a_2$ through $d_2$.

TABLE 25

| x | $x_1$ | $x_2$ | $x_3$ | x | $x_1$ | $x_2$ | $x_3$ |
|---|---|---|---|---|---|---|---|
| 0 | | | 0 | 32 | | | 0 |
| 1 | | | 1 | 33 | | | 1 |
| 2 | | 0 | 2 | 34 | | 0 | 2 |
| 3 | | | 3 | 35 | | | 3 |
| 4 | | | 0 | 36 | | | 0 |
| 5 | | 1 | 1 | 37 | | 1 | 1 |
| 6 | | | 2 | 38 | | | 2 |
| 7 | | | 3 | 39 | | | 3 |
| 8 | 0 | | 0 | 40 | 2 | | 0 |
| 9 | | | 1 | 41 | | | 1 |
| 10 | | 2 | 2 | 42 | | 2 | 2 |
| 11 | | | 3 | 43 | | | 3 |
| 12 | | | 0 | 44 | | | 0 |
| 13 | | 3 | 1 | 45 | | 3 | 1 |
| 14 | | | 2 | 46 | | | 2 |
| 15 | | | 3 | 47 | | | 3 |
| 16 | | | 0 | 48 | | | 0 |
| 17 | | 0 | 1 | 49 | | 0 | 1 |
| 18 | | | 2 | 50 | | | 2 |
| 19 | | | 3 | 51 | | | 3 |
| . | 1 | | . | . | 3 | | . |
| . | | | . | . | | | . |
| 28 | | | 0 | 60 | | | 0 |
| 29 | | 3 | 1 | 61 | | 3 | 1 |
| 30 | | | 2 | 62 | | | 2 |
| 31 | | | 3 | 63 | | | 3 |

Third-step threshold levels $T_3$'s are controlled by the first and the second decomposed picture element signals $x_1$ and $x_2$. More specifically, the third-step threshold levels $T_3$'s are decided as listed in Table 26 by a combination of the predicted first-step and second-step levels. A third decomposed picture element signal $x_3$ is now variable among four third-step levels, which are four of the sixty-four levels, as given in the rightmost column of Table 25. Similarly, a third transformed picture element signal $y_3$ is variable among four of the sixty-four levels as shown in FIG. 22 at 188. The picture element signal x in question is now predicted as one of the third-step levels, namely, as one of four of the sixty-four levels, by a third transformed reference signal $S_3$ consisting of the third transformed picture element signals $y_3$'s, such as $a_3$ through $d_3$.

TABLE 26

| $x_1$ | $x_2$ | $T_{31}$ | $T_{32}$ | $T_{33}$ |
|---|---|---|---|---|
| 0 | 0 | 1 | 2 | 3 |
| | 1 | 5 | 6 | 7 |
| | 2 | 9 | 10 | 11 |
| | 3 | 13 | 14 | 15 |
| 1 | 0 | 17 | 18 | 19 |
| | 1 | 21 | 22 | 23 |
| | 2 | 25 | 26 | 27 |
| | 3 | 29 | 30 | 31 |
| 2 | 0 | 33 | 34 | 35 |
| | 1 | 37 | 38 | 39 |
| | 2 | 41 | 42 | 43 |
| | 3 | 45 | 46 | 47 |
| 3 | 0 | 49 | 50 | 51 |
| | 1 | 53 | 54 | 55 |
| | 2 | 57 | 58 | 59 |
| | 3 | 61 | 62 | 63 |

It is possible more in general to predict each picture element signal x variable among a great number of individual levels 0 through (N−1), N in number, in first through M-th steps of prediction, M in number, by selecting an $N_1$-level through an $N_M$-level signal as first through M-th decomposed picture element signals $x_1$ to $x_M$. The first decomposed picture element signal $x_1$ is variable among a plurality of first-step levels or ranges, a first integer $N_1$ in number. The second decomposed picture element signal $x_2$ is variable among a plurality of second-step levels or ranges, a second integer $N_2$ in number, in a selected one of the first-step ranges. An m-th decomposed picture element signal $x_m$, where m represents each of 1 through M, is variable among a plurality of m-th-step levels or ranges, an m-th integer $N_m$ in number, in a selected one of the (m-1)-th-step ranges, $N_1 \times N_2 \times \ldots \times N_{m-1}$ in number. Herein, a product $N_1 \times N_2 \times \ldots \times N_M$ must be equal to or greater than the number N of individual levels so that the picture element signal x under consideration is predicted eventually in the M-th step of prediction to have one of the M-th-step levels or the individual levels. It is usual that another product $N_1 \times N_2 \times \ldots \times N_{M-1}$ is less than the number N of individual levels and that each of the integers $N_1$ through $N_M$ is greater than two and less than the number N.

In the (M=1)-th step of prediction, the actual level x is more roughly predicted than in the M-th step. In general, the actual level x is more finely or minutely predicted in the m-th step of prediction than in the (m−1)-th step. In the first step of prediction, the actual level x is most roughly predicted. It is unnecessary that all m-th decomposed picture element signals $x_m$'s be variable among the same number $N_m$ of m-th-step levels. The m-th integer $N_m$ should therefore be understood to define the greatest number of m-th-step levels among which every m-th decomposed picture element signal $x_m$ is variable. In other words, each m-th decomposed picture element signal $x_m$ may be variable at most among $N_m$ levels.

In general, an m-th decomposed picture element signal $x_m$ should be determined in consideration of the zeroth through the (m−1)-th decomposed picture element signals $x_0$ to $x_{m-1}$. Every m-th integer $N_m$ should be as great as possible provided that the ROM for deciding the m-th decomposed picture element signal $x_m$ need not have an objectionably great number of bits.

In order to effectively carry out the prediction, each picture element signal y of the reference signal S should also be transformed into a combination of a first transformed picture element signal $y_1$ through an M-th transformed picture element signal $y_M$ variable among the $N_1$ first-step levels through the $N_M$ M-th-step levels, respectively. An m-th transformed picture element signal $y_m$ should be decided in consideration of the zeroth through the (m−1)-th decomposed picture element signals $x_0$ to $x_{m-1}$. The number of m-th-step levels among which the m-th transformed picture element signal $y_m$ is variable may not necessarily be the m-th integer $N_m$ but may be equal to a different m-th integer $L_m$ which should be equal to or greater than two and equal to or less than the whole number N of individual levels. Each m-th transformed picture element signal $y_m$ may have one and the same m-th-step level regardless of the individual level y of the picture element signal y in question.

On predicting one of the m-th-step levels in the m-th step of prediction as the actual level x of the picture element signal x to be predicted, it will now be assumed that the prediction is carried out by the use of an m-th transformed reference signal $S_m$ consisting of a predetermined number s of the preceding and neighboring picture element signals y's. It is also presumed that each m-th transformed picture element signal $y_m$ is variable among $L_m$ m-th-step levels and that the different m-th integer $L_m$ is equal to or less than two of the power of an m-th natural number n(m) and is greater than two to the power of the m-th natural number less one [n(m)−1]. The level signal producing ROM 44 (FIG. 17) in each predictor, such as 151 or 152, should be responsive to the m-th transformed reference signal $S_m$ and produce a plurality of level signals $h_k$'s, $L_m$ in number. Each level signal $h_k$ has a plurality of bits, n(m) in number. The input address should therefore be s×n(m) in number. The output bits should be $L_m \times n(m)$ in number. The level signal selector 45 should be responsive to the n(m)-bit m-th decomposed picture element signal $x_m$ and the n(m)-bit level signals $h_k$'s, $L_m$ in number, and be capable of producing one-bit m-th-step prediction error codes $e_{mi}$'s, I(m) in number, where i represents each of 1 through I(m).

The number I(m) used hereinabove should be equal at most to the m-th natural number n(m). For example, let the m-th integer $L_m$ be equal to seven. The m-th-step levels may be 0 through 6. The level signals $h_k$'s need not represent an m-th-step level 7. With the m-th-step level 7 excluded, an m-th binary number $e_m$ represented by the m-th-step prediction error codes $e_{mi}$'s never becomes equal to decimal seven or binary 111. In other words, a third m-th-step prediction error code $e_{m3}$ is definitely zero if the first and the second m-th-step prediction error codes $e_{m1}$ and $e_{m2}$ are found to represent 1's, respectively. It is therefore unnecessary to use the third m-th-step prediction error code $e_{m3}$ for one of the level signals $h_k$'s that represents the m-th-step level 7. What are indispensable therefor are only the first and the second m-th-step prediction error codes $e_{m1}$ and $e_{m2}$, two in number. This applies to the prediction error codes $e_i$'s described either explicitly or implicitly in conjunction with FIGS. 1, 3 through 14, and 15.

While this invention has thus far been described with reference to the accompanying drawing figures, it will now be readily possible for those skilled in the art to carry this invention into effect in various other ways. This invention is applicable to a number of fields other than the facsimile transmission. For example, the picture element signal sequence to be compression encoded may be that derived from a television camera. As pointed out at the outset of the instant specification, the encoder may be used in storing a multilevel picture element signal sequence in a memory therefor. The decoder may be used for playback of the memorized compression encoded signal. DPCM encoding may be resorted to by the encoding circuit, such as 37, by encoding the prediction error codes, such as $e_1$ through $e_3$ or $e_{11}$ through $e_{13}$ and $e_{21}$ through $e_{23}$, for each picture element signal either into a Huffman code or a similar code. On so encoding, the prediction error may be given by subtracting the predicted level $\check{x}$ from the actual level $\hat{x}$. In this event, the level x of each reproduced picture element signal is given in the decoding circuit, such as 82, by a sum of the prediction error and the predicted level x.

What is claimed is:

1. A multilevel picture element signal encoder-decoder system comprising an encoder and a decoder;

said encoder being for encoding a sequence of original picture element signals into a compression encoded signal, each picture element signal x being capable of taking each of a plurality of levels, more than two in number, with a first probability dependent on an original reference signal S consisting of those of the picture element signals in said sequence which precede said each picture element signal x in a predetermined relationship with respect to said each picture element signal x, said levels being assigned with serial numbers, respectively, according to the respective first probabilities, said encoder comprising:

prediction error code producing means responsive to said reference signal S and said each picture element signal x for producing a predetermined number of prediction error codes which are so dependent on the serial number assigned to the level actually taken by said each picture element signal x as to represent a prediction error;

mode code producing means responsive to said reference signal S and said prediction error codes for producing a plurality of mode codes allotted to the respective prediction error codes, each mode code being representative of a second probability that the prediction error code allotted therewith represents zero;

grouping means for grouping the prediction error codes produced for the picture element signals in said sequence in accordance with the mode codes allotted thereto; and compression encoding means for compression encoding the grouped prediction error codes into said compression encoded signal;

said decoder being for expansion decoding said compression encoded signal into a sequence of reproduced picture element signals by reproducing the mode codes for each reproduced picture element signal in response to a reproduced reference signal consisting of those of the reproduced picture element signals in said reproduced picture element signal sequence, which precede said each reproduced picture element signal in said predetermined relationship with respect to said each reproduced picture element signal, and in response to those reproductions of the prediction error codes into which said compression encoded signal is expansion decoded as regards said each reproduced picture element signal with reference to the reproduced mode codes.

2. An encoder-decoder system as claimed in claim 1, wherein each of said original picture element signal sequence and said reproduced picture element signal sequence is a monochromatic picture element signal sequence.

3. An encoder-decoder system as claimed in claim 1, wherein each of said original picture element signal sequence and said reproduced picture element signal sequence is a multicolor picture element signal sequence.

4. An encoder for encoding a sequence of N-level picture element signals into a compression encoded signal, N being representative of an integer greater than $2^{n-1}$ and not greater than $2^n$, where n represents a natural number greater than unity, each picture element signal x being capable of taking each of N levels with a first probability dependent on a reference signal S consisting of those of the picture element signals in said sequence which precede said each picture element signal x in a predetermined relationship with respect to said each picture element signal x, said each picture element signal x actually taking one of said N levels, said encoder comprising:

prediction error code producing means responsive to said reference signal S and said each picture element signal x for producing a predetermined number of prediction error codes $e_i$'s, I in number, where I represents an integer equal at most to said natural number n, i being representative of each of 1 through I, an i-th prediction error code $e_i$ taking either of binary "0" and "1" levels so that a binary number e represented by said prediction error codes $e_i$'s is equal to that one of N serial numbers increasing consecutively from zero and assigned to the respective first probabilities arranged in a monotonously decreasing order which is assigned to the first probability for said one level;

mode code producing means responsive to said reference signal S and said prediction error codes $e_i$'s for producing a plurality of mode codes $M_i$'s allotted to the respective prediction error codes $e_i$'s, an i-th mode code $M_i$ taking either of the binary "0" and "1" levels depending on a second probability that the i-th prediction error code $e_i$ has the binary "0" level;

grouping means for grouping the prediction error codes produced for the picture element signals in said sequence in accordance with the mode codes allotted thereto; and compression encoding means for compression encoding the grouped prediction error codes into said compression encoded signal.

5. An encoder as claimed in claim 4, wherein said prediction error code producing means comprises:

first means responsive to said reference signal S for producing N level signals $h_k$'s representative of the respective levels to be taken by said each picture element signal x, k being representative of each of said N serial numbers;

second means responsive to said each picture element signal x for selecting one of said level signals $h_k$'s, the level represented by which is best coincident with the actual level; and third means responsive to the selected level signal for producing the prediction error codes $e_i$'s for said each picture element signal x.

6. An encoder as claimed in claim 4, wherein the i-th prediction error code $e_i$ is representative of an i-th binary bit of said binary number e as counted from the most significant bit towards the least significant bit, said mode code producing means comprises means for producing the i-th mode code $M_i$ in response to said reference signal S and a predetermined number of the prediction error codes $e_i$'s, (i−1) in number, with said predetermined number of prediction error codes $e_i$'s selected from the first prediction error code $e_1$ successively towards the (I−1)-th prediction error code $e_{I-1}$.

7. An encoder for encoding a sequence of N-level picture element signals into a compression encoded signal, N being representative of a zeroth integer greater than $2^{n-1}$ and not greater than $2^n$, where n represents a zeroth natural number greater than eight, each picture element signal x being capable of taking each of N levels depending on a reference signal S consisting of those of the picture element signals in said sequence which precede said each picture element signal x in a predetermined relationship with respect to said each picture element signal x, said each picture element signal x actually taking one of said N levels, said encoder comprising:

decomposing means for decomposing said each picture element signal x with said each picture element signal x deemed to be a zeroth decomposed picture element signal $x_0$ into first through M-th decomposed picture element signals $x_1$ to $x_M$, an m-th decomposed picture element signal $x_m$ being derived in response to said zeroth through the (m−1)-th decomposed picture element signals $x_0$ to $x_{m-1}$, said m-th decomposed picture element signal $x_m$ actually taking one of at most $N_m$ m-th-step levels depending on said one of N levels, m being representative of each of 1 through M, $N_m$ being representative of an m-th integer greater than $2^{n(m)-1}$ and not greater than $2^{n(m)}$, where n(m) represents an m-th natural number greater than unity and not greater than said zeroth natural number less one (n−1), a product of the first through the M-th integers $N_1$ to $N_M$ being not less than said zeroth integer N;

transforming means for transforming each picture element signal y of said reference signal S with said each reference signal picture element signal y considered to be a zeroth transformed picture element signal $y_0$ into first through M-th transformed picture element signals $y_1$ to $y_M$, an m-th transformed picture element signal $y_m$ being derived in response to said zeroth through said (m−1)-th decomposed picture element signals $x_0$ to $x_{m-1}$ to take one of at most $L_m$ m-th-step levels, $L_m$ being representative of an integer not less than two and not greater than said zeroth integer N, the m-th transformed picture element signals $y_m$'s derived from the respective picture element signals y's of said reference signal S providing an m-th transformed reference signal $S_m$, said m-th decomposed picture element signal $x_m$ being capable of taking each of said $N_m$ m-th-step levels with a first m-th-step probability dependent on said m-th transformed reference signal $S_m$;

prediction error code producing means responsive to said m-th transformed reference signal $S_m$ and said m-th decomposed picture element signal $x_m$ for producing a plurality of m-th-step prediction error codes $e_{mi}$'s, I(m) in number, where I(m) represents an integer equal at most to said m-th natural number n(m), an i-th m-th-step prediction error code $e_{mi}$ taking either of binary "0" and "1" levels so that an m-th binary number $e_m$ represented by said m-th-step prediction error codes $e_{mi}$'s is equal to that one of $N_m$ serial numbers increasing consecutively from zero and assigned to the respective first m-th-step probabilities arranged in a monotonously decreasing order which is assigned to the first m-th-step probability for said one of $N_m$ levels, i being representative of each of 1 through I(m);

mode code producing means responsive to said m-th transformed reference signal $S_m$ and said m-th-step prediction error codes $e_{mi}$'s for producing a plurality of m-th-step mode codes $M_{mi}$'s allotted to the first through the I(m)-th m-th-step prediction error codes $e_{mi}$'s, respectively, an i-th m-th-step mode code $M_{mi}$ taking either of the binary "0" and "1" levels depending on a second m-th-step probability that the i-th m-th-step prediction error code $e_{mi}$ has the binary "0" level;

grouping means for grouping the prediction error codes produced in response to said first through said M-th decomposed picture element signals for the picture element signals in said sequence in accordance with the mode codes allotted thereto; and compression encoding means for compression encoding the grouped prediction error codes into said compression encoded signal.

8. An encoder as claimed in claim 7, wherein said prediction error code producing means comprises, for each of said first through said M-th decomposed picture element signals $x_1$ to $x_M$;

first means responsive to the m-th transformed reference signal $S_m$ for producing $N_m$ level signals $h_k$'s representative of the respective m-th-step levels to be taken by said m-th decomposed picture element signal $x_m$, k being representative of each of said $N_m$ serial numbers;

second means responsive to said m-th decomposed picture element signal $x_m$ for selecting one of said level signals $h_k$'s, the level represented by which is best coincident with said actually taken m-th-step level; and third means responsive to the selected level signal for producing the m-th-step prediction error codes $e_{mi}$'s for said m-th decomposed picture element signal $x_m$.

9. An encoder as claimed in claim 7, wherein the i-th m-th-step prediction error code $e_{mi}$ is representative of an i-th binary bit of said m-th binary number $e_m$ as counted from the most significant bit towards the least significant bit, said mode code producing means comprises, for each of said first through said m-th decomposed picture element signals $x_1$ to $x_M$, means for producing the i-th m-th-step mode code $M_{mi}$ in response to said m-th transformed reference signal $S_m$ and a predetermined number of the m-th-step prediction error codes $e_{mi}$'s, (i−1) in number, with said predetermined number of m-th-step prediction error codes $e_{mi}$'s selected from the first m-th-step prediction error code $e_{m1}$ successively towards the [I(m)−1]-th m-th-step prediction error code $e_{m[I(m)-1]}$.

10. An encoder as claimed in any one of claims 4 through 9, wherein said picture element signal sequence is a monochromatic picture element signal sequence.

11. An encoder as claimed in any one of claims 4 through 9, wherein said picture element signal sequence is a multicolor picture element signal sequence.

12. An encoder as claimed in any one of claims 4 through 9, said compression encoded signal being a sequence of run length codes, wherein:

said grouping means comprises:

means for arranging the prediction error codes produced for the picture element signals of said sequence into a single sequence of prediction error codes;

means responsive to the prediction error codes in said single sequence and the binary "1" mode codes for producing prediction error codes of a first sequence; and means responsive to the prediction error codes in said single sequence and the binary "0" mode codes for producing prediction error codes of a second sequence;

said compression encoding means comprising;

first run start pulse generating means responsive to each binary "1" first-sequence prediction error code for generating a first run start pulse;

second run start pulse generating means responsive to each binary "1" second-sequence prediction error code for generating a second run start pulse;

first run length code generating means responsive to each pair of consecutive first run start pulses for generating a run length code of a first kind representative of the number of the first-sequence prediction error code interposed between said each consecutive first run start pulse pair;

second run length code generating means responsive to each pair of consecutive second run start pulses for generating a run length code of a second kind representative of the number of the second-sequence prediction error code interposed between said each consecutive second run start pulse pair; and output means for arranging the run length codes of said first and said second kinds into said sequence of run length codes according to the order in which earlier produced ones of the first and the second run start pulse pairs are produced.

13. A decoder for decoding a compression encoded signal into a sequence of N-level reproduced picture element signals, N being representative of an integer greater than $2^{n-1}$ and not greater than $2^n$, where n represents a natural number greater than unity, each picture element signal x being capable of taking each of N levels with a first probability dependent on a reproduced reference signal S consisting of those of the picture element signals in said sequence which precede said each picture element signal x in a predetermined relationship with respect to said each picture element signal x, said each picture element signal x actually taking one of said N levels, said compression encoded signal being derived from a sequence of original picture element signals, each original picture element signal being capable of taking each of said N levels with the first probability determined by an original reference signal consisting of those of the original picture element signals in said original picture element signal sequence which precede said each original picture element signal in said predetermined relationship with respect to said each original picture element signal, said compression encoded signal being derived by producing in response to said original reference signal and said each original picture element signal first through I-th original prediction error codes representative of the most signficant through the least significant bits of a binary number equal to that one of N serial numbers increasing consecutively from zero and assigned to the respective first probabilities arranged in a monotonously decreasing order which is assigned to the level actually taken by said each original picture element signal, I being representative of an integer equal at most to said natural number n, by allotting I mode codes to the respective prediction error codes with an i-th mode code given either of binary "0" and "1" levels depending on a second probability determined by said original reference signal and a predetermined number of the prediction error codes, (i−1) in number, where i represents each of 1 through I, with said predetermined number of prediction error codes selected from the first prediction error code successively towards the (I−1)-th prediction error code, by grouping the prediction error codes produced for the original picture element signal sequence in accordance with the mode codes allotted thereto, and by compression encoding the grouped prediction error codes into said compression encoded signal, said reproduced picture element signals being in one-to-one correspondence to said original picture element signals, said each reproduced picture element signal x being driven by first through I-th reproduced prediction error codes $e_i$'s equal to the respective original prediction error codes produced for the corresponding original picture element signal, said decoder comprising:

first means responsive to said reproduced reference signal S for reproducing the first mode code $M_1$ to be allotted to the first reproduced prediction error code $e_1$;

second means responsive to said compression encoded signal and the reproduced first mode code $M_1$ for producing said first reproduced prediction error code $e_1$; and third means responsive to said compression encoded signal, said reproduced reference signal S, said reproduced first mode code $M_1$, and said first reproduced prediction error code $e_1$ for reproducing the mode codes $M_i$'s other than said first mode code $M_1$ and the reproduced prediction error codes $e_i$'s other than said first reproduced prediction error code $e_1$.

14. A detector for decoding a compression encoded signal into a sequence of N-level reproduced picture element signals, N being representative of a zeroth integer greater than $2^{n-1}$ and not greater than $2^n$, where n represents a zeroth natural number greater than eight, each picture element signal x being capable of taking each of N levels depending on a reproduced reference signal S consisting of those of the picture element signals in said sequence which precede said each picture element signal x in a predetermined relationship with respect to said each picture element signal x, said each picture element signal x actually taking one of said N levels, said compression encoded signal being derived from a sequence of original picture element signals, each original picture element signal being capable of taking each of said N levels depending on an original reference signal consisting of those of the original picture element signals in said original picture element signal sequence which precede said each original picture element signal in said predetermined relationship with respect to said each original picture element signal, said compression encoded signal being derived by decomposing said each original picture element signal into first through M-th decomposed picture element signals with said each original picture element signal deemed to be a zeroth decomposed picture element signal and with an m-th decomposed picture element signal derived in response to said zeroth through the (m−1)-th decomposed picture element signals, where m represents each of 1 through M, and by transforming eachoriginal picture element signal of said original reference signal into first through M-th transformed picture element signals with said each original reference signal picture element signal considered to be a zeroth transformed picture element signal, said m-th decomposed picture element signal actually taking one of at most $N_m$ m-th-step levels depending on the level actually taken by said zeroth decomposed picture element signal, where $N_m$ represents an m-th integer greater than $2^{n(m)-1}$ and not greater than $2^{n(m)}$ and where n(m) represents an m-th natural number greater than unity and not greater than said zeroth natural number less one (n−1), a product of the first through the M-th integers $N_1$ to $N_M$ being not less than said zeroth integer N, an m-th transformed picture element signal being derived in response to said zeroth through said (m−1)-th decomposed picture element signals to take one of at most $L_m$ m-th-step levels where $L_m$ represents an integer not less than two and not greater than said zeroth integer N, the m-th transformed picture element signals derived from the respective original reference signal picture element signals providing an m-th transformed reference signal, said m-th decomposed picture element signal being capable of taking each of said $N_m$ m-th-step levels with a first m-th-step probability dependent on said m-th transformed reference signal, said compression encoded signal being derived further by providing first through I(m)-th m-th-step original prediction error codes representative of an m-th binary number equal to that one of $N_m$ serial numbers increasing consecutively from zero and assigned to the respective first m-th-step probabilities arranged in a monotonously decreasing order which is assigned to the m-th-step level actually taken by said m-th decomposed picture element signal, where I(m) represents an integer equal at most to said m-th natural number n(m), by allotting I(m) m-th-step mode codes to the respective m-th-step original prediction error codes with an i-th m-th-step mode code given either of binary "0" and "1" levels depending on a second m-th-step probability determined by said m-th transformed reference signal and a predetermined number of the m-th-step original prediction error codes, (i−1) in number, where i represents each of 1 through I(m), with said predetermined number of m-th-step original prediction error codes selected from the first m-th-step original prediction error code successively towards the [I(m)−1]-th m-th-step original prediction error codes, by grouping the original prediction error codes produced in response to said first through said M-th decomposed picture element signals for the picture element signals in said original picture element signal sequence in accordance with the mode codes allotted thereto, and by compression encoding the grouped prediction error codes into said compression encoded signal, said reproduced picture element signals being in one-to-one correspondence to said original picture element signals, said each reproduced picture element signal x being given by one each of first through M-th elementary picture element signals, an m-th elementary picture element signal being given by first through I(m)-th m-th-step reproduced prediction error codes $e_{mi}$'s equal to the respective original m-th-step prediction error modes produced for the m-th decomposed picture element signal for the corresponding original picture element signal.

* * * * *

UNITED STATES PATENT AND TRADEMARK OFFICE
CERTIFICATE OF CORRECTION

PATENT NO. : 4,344,086

DATED : August 10, 1982

INVENTOR(S) : Shoji Mizuno

It is certified that error appears in the above—identified patent and that said Letters Patent is hereby corrected as shown below:

Column 2, line 52, delete "x", insert --$\underline{x}$--;

line 56, delete "x", insert --$\underline{x}$--;

line 58, delete "x", insert --$\underline{x}$--;

line 63, delete "x", insert --$\underline{x}$--;

line 66, delete "x", insert --$\underline{x}$--.

Column 3, line 29, delete "n", insert --$\underline{n}$--;

line 30, delete "x", insert --$\underline{x}$--;

line 34, delete "x", insert --$\underline{x}$--;

line 36, delete "x", insert --$\underline{x}$--;

line 37, delete "x", insert --$\underline{x}$--;

line 42, delete "x", insert --$\underline{x}$--;

line 45, delete "n", insert --$\underline{n}$--;

line 46, delete "i", insert --$\underline{i}$--;

line 48, delete "e", insert --$\underline{e}$--.

Column 4, line 2, delete "n", insert --$\underline{n}$--;

line 4, delete "x", insert --$\underline{x}$--;

line 8, delete "x", insert --$\underline{x}$--;

UNITED STATES PATENT AND TRADEMARK OFFICE
CERTIFICATE OF CORRECTION

PATENT NO. : 4,344,086
DATED : August 10, 1982
INVENTOR(S) : Shoji Mizuno

It is certified that error appears in the above—identified patent and that said Letters Patent is hereby corrected as shown below:

Column 4, line 10, delete (both occurrences) delete "x", insert --$\underline{x}$--;

line 33, delete "n", insert --$\underline{n}$--;

line 38, delete "i", insert --$\underline{i}$--;

line 50, delete "x", insert --$\underline{x}$--.

Column 6, line 36, delete "n", insert --$\underline{n}$--.

Column 7, line 1, delete "x", insert --$\underline{x}$--;

line 2, delete "x", insert --$\underline{x}$--;

line 4, delete "x", insert --$\underline{x}$--;

line 7, delete "x", insert --$\underline{x}$--;

line 8, delete "x", insert --$\underline{x}$--;

line 12, delete "x", insert --$\underline{x}$--;

line 13, delete "x", insert --$\underline{x}$--;

line 15, delete "g", insert --$\underline{g}$--;

line 17, delete (first occurrence) "x", insert --$\underline{\hat{x}}$--;

line 17, delete (second occurrence) "x", insert --$\underline{x}$--;

line 21, delete "a, b, and c", insert --$\underline{a}$, $\underline{b}$, and $\underline{c}$--;

UNITED STATES PATENT AND TRADEMARK OFFICE
CERTIFICATE OF CORRECTION

PATENT NO. : 4,344,086

DATED : August 10, 1982

INVENTOR(S) : Shoji Mizuno

It is certified that error appears in the above-identified patent and that said Letters Patent is hereby corrected as shown below:

Column 7, line 23, delete "x", insert --$\underline{x}$--;

line 25, delete "b", insert --$\underline{b}$--;

line 26, delete "x", insert --$\underline{x}$--;

line 26, delete "d", insert --$\underline{d}$--;

line 27, delete "x", insert --$\underline{x}$--;

line 34, delete "a", insert --$\underline{a}$--;

line 34, delete "d", insert --$\underline{d}$--;

line 35, delete "a", insert --$\underline{a}$--;

line 35, delete "d", insert --$\underline{d}$--;

line 37, delete "x", insert --$\underline{x}$--;

line 38, delete "a", insert --$\underline{a}$--;

line 38, delete "d", insert --$\underline{d}$--;

line 46, delete "a", insert --$\underline{a}$--;

line 46, delete "d", insert --$\underline{d}$--;

line 48, delete "a", insert --$\underline{a}$--;

line 48, delete "d", insert --$\underline{d}$--;

line 60, delete "x", insert --$\underline{x}$--;

UNITED STATES PATENT AND TRADEMARK OFFICE
CERTIFICATE OF CORRECTION

PATENT NO. : 4,344,086
DATED : August 10, 1982
INVENTOR(S) : Shoji Mizuno

It is certified that error appears in the above—identified patent and that said Letters Patent is hereby corrected as shown below:

Column 7, line 60, delete "a", insert --$\underline{a}$--;

line 60, delete "d", insert --$\underline{d}$--;

line 62, delete "g", insert --$\underline{g}$--;

line 68, delete (first occurrence) "x", insert --$\underline{x}$--.

Column 8, line 2, delete "g.", insert --$\underline{g.}$--;

line 28, delete "a", insert --$\underline{a}$--;

line 31, delete "x", insert --$\underline{x}$--;

line 31, delete "x", insert --$\underline{x}$--;

line 34, delete (both occurrences) "x", insert --$\underline{x}$--;

line 38, delete "a", insert --$\underline{a}$--;

line 39, delete "d", insert --$\underline{d}$--;

line 41, delete "a", insert --$\underline{a}$--;

line 41, delete "d", insert --$\underline{d}$--;

line 59, delete (second line TABLE 1) "x", insert --$\hat{x}$--;

line 67, delete (second line TABLE 2) "x", insert --$\hat{x}$--.

Column 9, line 43, delete "illustrated", insert --described--;

line 48, delete "x", insert --$\underline{x}$--;

UNITED STATES PATENT AND TRADEMARK OFFICE
CERTIFICATE OF CORRECTION

PATENT NO. : 4,344,086
DATED : August 10, 1982
INVENTOR(S) : Shoji Mizuno

It is certified that error appears in the above—identified patent and that said Letters Patent is hereby corrected as shown below:

Column 9, line 52, delete "x", insert --$\underline{x}$--;

line 57, delete "k", insert --$\underline{k}$--;

line 58, delete "k's", insert --$\underline{k}$'s--;

line 65, delete "k's.", insert --$\underline{k}$'s.--;

line 66, delete "k", insert --$\underline{k}$--.

Column 10, line 12, delete "x,", insert --$\underline{x}$,--;

line 15, delete "x.", insert --$\underline{x}$.--;

line 19, delete "e.", insert --$\underline{e}$.--;

line 21, delete "e", insert --$\underline{e}$--;

line 30, delete "e", insert --$\underline{e}$--;

line 34, delete "x", insert --$\underline{x}$--;

line 37, delete "e", insert --$\underline{e}$--.

Column 11, line 17, delete "k", insert --$\underline{k}$--;

line 24, delete "x", insert --$\underline{x}$--;

line 26, delete "e's", insert --$\underline{e}$'s--;

line 29, delete "x", insert --$\underline{x}$--;

line 31, delete "e's", insert --$\underline{e}$'s--;

UNITED STATES PATENT AND TRADEMARK OFFICE
CERTIFICATE OF CORRECTION

PATENT NO. : 4,344,086
DATED : August 10, 1982
INVENTOR(S) : Shoji Mizuno

It is certified that error appears in the above—identified patent and that said Letters Patent is hereby corrected as shown below:

Column 11, line 33, delete "x", insert --$\underline{x}$--;

line 36, delete "e's", insert --$\underline{e}$'s--.

Column 13, line 30, delete "x", insert --$\underline{x}$--;

line 42, delete "x", insert --$\underline{x}$--;

line 59, delete "x", insert --$\underline{x}$--.

Column 14, line 42, delete "e's", insert --$\underline{e}$'s--;

line 43, delete "x,", insert --$\underline{x}$,--;

line 47, delete "e's", insert --$\underline{e}$'s--;

line 58, delete "g", insert --$\underline{g}$--;

line 61, delete "g's", insert --$\underline{g}$'s--.

Column 15, line 18, delete "x,", insert --$\underline{x}$,--;

line 37, delete ""0" or "1").", insert --"0" or "1").--

Column 16, line 13, delete "x,", insert --$\underline{x}$--;

line 15, delete "e", insert --$\underline{e}$--;

line 17, delete "e", insert --$\underline{e}$--;

line 20, delete "e", insert --$\underline{e}$--.

Column 20, line 18, delete "in", insert --is--.

UNITED STATES PATENT AND TRADEMARK OFFICE
CERTIFICATE OF CORRECTION

PATENT NO. : 4,344,086
DATED : August 10, 1982
INVENTOR(S) : Shoji Mizuno

It is certified that error appears in the above—identified patent and that said Letters Patent is hereby corrected as shown below:

Column 21, line 8, delete "a", insert --$\underline{a}$--;

line 9, delete "d", insert --$\underline{d}$--;

line 9, delete "x", insert --$\underline{x}$--;

line 13, delete "x.", insert --$\underline{x}$.--;

line 28, delete "x.", insert --$\underline{x}$.--;

line 54, delete "e", insert --$\underline{e}$--;

line 55, delete "e", insert --$\underline{e}$--;

line 65, delete "k", insert --$\underline{k}$--;

line 66, delete "e.", insert --$\underline{e}$.--;

line 68, delete "x.", insert --$\underline{x}$.--.

Column 22, line 2, delete "particular element", insert --particular picture element--;

line 2, delete "x", insert --$\underline{x}$--;

line 5, delete "x", insert --$\underline{x}$--;

line 15, delete "curcit", insert --circuit--.

Column 23, line 58, delete "coes", insert --codes--.

UNITED STATES PATENT AND TRADEMARK OFFICE
CERTIFICATE OF CORRECTION

PATENT NO. : 4,344,086

DATED : August 10, 1982

INVENTOR(S) : Shoji Mizuno

It is certified that error appears in the above—identified patent and that said Letters Patent is hereby corrected as shown below:

Column 24, line 9, delete "UNB", insert --ENB--.

Column 26, line 60, delete "x", insert --$\underline{x}$--.

Column 27, line 24, delete "x", insert --$\underline{x}$--;

line 25, delete "x", insert --$\underline{x}$--;

line 27, delete "e", insert --$\underline{e}$--;

line 28, delete (first occurrence) "x", insert --$\hat{\underline{x}}$--;

line 28, delete (second occurrence) "x", insert --$\underline{x}$--;

line 29, delete "e", insert --$\underline{e}$--;

line 34, delete "a", insert --$\underline{a}$--;

line 34, delete "d", insert --$\underline{d}$--;

line 42, delete "x", insert --$\underline{x}$--;

line 42, delete "a", insert --$\underline{a}$--;

line 42, delete "d", insert --$\underline{d}$--;

line 46, delete "ROW", insert --ROM--;

line 52, delete "x", insert --$\underline{x}$--;

line 54, delete "x", insert --$\underline{x}$--;

line 54, after "x", insert --be--;

UNITED STATES PATENT AND TRADEMARK OFFICE
CERTIFICATE OF CORRECTION

PATENT NO. : 4,344,086
DATED : August 10, 1982
INVENTOR(S) : Shoji Mizuno

It is certified that error appears in the above—identified patent and that said Letters Patent is hereby corrected as shown below:

Column 27, line 54, after "and" insert --be--;

line 56, delete "x", insert --$\underline{x}$--;

line 60, delete "p", insert --$\underline{p}$--;

line 61, delete "x", insert --$\underline{x}$--;

line 64, delete "x", insert --$\underline{x}$--;

line 68, delete "of", insert --to--;

line 68, delete "x", insert --$\underline{x}$--.

Column 28, line 32, delete "a through d", insert --$\underline{a}$ through $\underline{d}$--;

line 33, delete "x", insert --$\underline{x}$--;

line 37, delete "x", insert --$\underline{x}$--;

line 41, delete "x", insert --$\underline{x}$--;

line 44, delete "y", insert --$\underline{y}$--;

line 47, delete "y", insert --$\underline{y}$--;

line 52, delete "q", insert --$\underline{q}$--;

line 64, delete "x", insert --$\underline{x}$--;

line 67, delete "y", insert --$\underline{y}$--.

Column 29, line 42, delete "y", insert --$\underline{y}$--;

UNITED STATES PATENT AND TRADEMARK OFFICE
CERTIFICATE OF CORRECTION

PATENT NO. : 4,344,086
DATED : August 10, 1982
INVENTOR(S) : Shoji Mizuno

It is certified that error appears in the above—identified patent and that said Letters Patent is hereby corrected as shown below:

Column 29, line 44, delete "q", insert --$\underline{q}$--.

Column 30, line 11, delete "x", insert --$\underline{x}$-- (both occurrences).

line 16, delete "x", insert --$\underline{x}$--;

line 17, delete "y's", insert --$\underline{y}$'s--;

line 17, delete "a", insert --$\underline{a}$--;

line 18, delete "d", insert --$\underline{d}$--;

line 19, delete "x.", insert --$\underline{x}$.--;

line 23, delete "x and y's,", insert --$\underline{x}$ and $\underline{y}$'s,--;

line 32, delete "x and y's,", insert --$\underline{x}$ and $\underline{y}$'s,--;

line 37, delete "a through d", insert --$\underline{a}$ through $\underline{d}$--;

line 62, delete "e", insert --$\underline{e}$--;

line 63, delete "x", insert --$\underline{x}$--.

Column 31, line 20, delete "x", insert --$\underline{x}$--;

line 48, delete "p(0| $S_j$, $e_{11}$),", insert --P(0| $S_j$, $e_{11}$),--;

line 55, delete "$\hat{x}$.", insert --$\underline{x}$.--;

UNITED STATES PATENT AND TRADEMARK OFFICE
CERTIFICATE OF CORRECTION

PATENT NO. : 4,344,086

DATED : August 10, 1982

INVENTOR(S) : Shoji Mizuno

It is certified that error appears in the above—identified patent and that said Letters Patent is hereby corrected as shown below:

Column 31, line 61, delete "e", insert --$\underline{e}$--;

line 62, delete (first occurrence) "x", insert --$\underline{x}$--;

line 62, delete (second occurrence) "x.", insert --$\hat{\underline{x}}$.--.

Column 32, line 6, delete "e", insert --$\underline{e}$--;

line 9, delete "e", insert --$\underline{e}$--;

line 10, delete "x", insert --$\underline{x}$--;

line 12, delete "x", insert --$\underline{x}$--;

line 22, delete "x,", insert --$\underline{x}$,--.

Column 33, line 11, delete "e's", insert --$\underline{e}$'s--;

line 19, delete "y's or a through d", insert --$\underline{y}$'s or $\underline{a}$ through $\underline{d}$--;

line 21, delete "x", insert --$\underline{x}$--;

line 30, delete "y's.", insert --$\underline{y}$'s.--;

line 35, delete "x", insert --$\underline{x}$--;

line 37, delete "y's", insert --$\underline{y}$'s--;

UNITED STATES PATENT AND TRADEMARK OFFICE
CERTIFICATE OF CORRECTION

PATENT NO. : 4,344,086
DATED : August 10, 1982
INVENTOR(S) : Shoji Mizuno

It is certified that error appears in the above—identified patent and that said Letters Patent is hereby corrected as shown below:

Column 33, line 50, delete "a through d,", insert --$\underline{a}$ through $\underline{d}$,--;

line 59, delete "x,", insert --$\underline{x}$,--.

Column 34, line 4, delete "x", insert --$\underline{x}$--;

line 7, delete "x", insert --$\underline{x}$--;

line 10, delete "x.", insert --$\underline{x}$.--;

line 11, delete "x", insert --$\underline{x}$--;

line 13, delete "a through d and x", insert --$\underline{a}$ through $\underline{d}$ and $\underline{x}$--;

line 49, delete "x or y", insert --$\underline{x}$ or $\underline{y}$--;

line 67, delete "x", insert --$\underline{x}$--.

Column 36, line 5, delete "x", insert --$\underline{x}$--;

line 29, delete "x", insert --$\underline{x}$--;

line 40, delete "where m", insert --where $\underline{m}$--;

line 47, delete "x", insert --$\underline{x}$--;

line 54, delete "(M=1)-th", insert --(M-1)-th--;

line 54, delete "x", insert --$\underline{x}$--;

line 56, delete "x", insert --$\underline{x}$--;

UNITED STATES PATENT AND TRADEMARK OFFICE
CERTIFICATE OF CORRECTION

PATENT NO. : 4,344,086
DATED : August 10, 1982
INVENTOR(S) : Shoji Mizuno

It is certified that error appears in the above—identified patent and that said Letters Patent is hereby corrected as shown below:

Column 36, line 59, delete "x", insert --$\underline{x}$--.

Column 37, line 9, delete "y", insert --$\underline{y}$--;

line 25, delete "y", insert --$\underline{y}$--;

line 26, delete "y", insert --$\underline{y}$--;

line 28, delete "x", insert --$\underline{x}$--;

line 29, delete "x", insert --$\underline{x}$--;

line 32, delete "s", insert --$\underline{s}$--;

line 33, delete "y's.", insert --$\underline{y}$'s.--;

line 50, delete "i", insert --$\underline{i}$--.

Column 38, line 22, delete "$\hat{x}$." (first occurrence), insert --$\underline{x}$.--;

line 22, delete "x" (second occurrence), insert --$\underline{x}$--;

line 25, delete "x.", insert --$\underline{\hat{x}}$.--;

line 31, delete "x", insert --$\underline{x}$--;

line 37, delete "x", insert --$\underline{x}$--;

line 38, delete "x,", insert --$\underline{x}$,--;

line 44, delete "x", insert --$\underline{x}$--;

line 47, delete "x", insert --$\underline{x}$--.

UNITED STATES PATENT AND TRADEMARK OFFICE
CERTIFICATE OF CORRECTION

PATENT NO. : 4,344,086
DATED : August 10, 1982
INVENTOR(S) : Shoji Mizuno

It is certified that error appears in the above—identified patent and that said Letters Patent is hereby corrected as shown below:

Column 39, line 24, delete "n", insert --$\underline{n}$--;

line 26, delete "x", insert --$\underline{x}$--;

line 30, delete "x", insert --$\underline{x}$--;

line 31, delete "x,", insert --$\underline{x}$,--;

line 32, delete "x", insert --$\underline{x}$--;

line 36, delete "x", insert --$\underline{x}$--;

line 39, delete "n,i", insert --$\underline{n},\underline{i}$--;

line 42, delete "e", insert --$\underline{e}$--.

Column 40, line 1, delete "x,k", insert --$\underline{x},\underline{k}$--;

line 4, delete "x", insert --$\underline{x}$--;

line 9, delete "x.", insert --$\underline{x}$.--;

line 12, delete "e", insert --$\underline{e}$--;

line 24, delete "n", insert --$\underline{n}$--;

line 26, delete "x", insert --$\underline{x}$--;

line 30, delete "x", insert --$\underline{x}$--;

line 31, delete "x,", insert --$\underline{x}$,--;

line 32, delete "x", insert --$\underline{x}$--;

UNITED STATES PATENT AND TRADEMARK OFFICE
CERTIFICATE OF CORRECTION

PATENT NO. : 4,344,086
DATED : August 10, 1982
INVENTOR(S) : Shoji Mizuno

It is certified that error appears in the above—identified patent and that said Letters Patent is hereby corrected as shown below:

Column 40, line 35, delete "x", insert --$\underline{x}$--;

line 36, delete "x", insert --$\underline{x}$--;

line 44, delete "m", insert --$\underline{m}$--;

line 54, delete "y", insert --$\underline{y}$--;

line 55, delete "y", insert --$\underline{y}$--;

line 66, delete "y's", insert --$\underline{y}$'s--.

Column 41, line 18, delete "i", insert --$\underline{i}$--;

line 46, delete "k", insert --$\underline{k}$--.

Column 42, line 54, delete "n", insert --$\underline{n}$--;

line 56, delete "x", insert --$\underline{x}$--;

line 60, delete "x", insert --$\underline{x}$--;

line 62, delete "x,", insert --$\underline{x}$,--;

line 62, delete "x", insert --$\underline{x}$--.

Column 43, line 16, delete "n,", insert --$\underline{n}$,--;

line 21, delete "i", insert --$\underline{i}$--;

line 33, delete "x", insert --$\underline{x}$--;

line 33, delete "driven", insert --given--;

UNITED STATES PATENT AND TRADEMARK OFFICE
CERTIFICATE OF CORRECTION

PATENT NO. : 4,344,086
DATED : August 10, 1982
INVENTOR(S) : Shoji Mizuno

It is certified that error appears in the above—identified patent and that said Letters Patent is hereby corrected as shown below:

Column 43, line 54, delete "detector", insert --decoder--;

line 57, delete "n", insert --$n$--;

line 59, delete "x", insert --$x$--;

line 63, delete "x", insert --$x$--;

line 64, delete "x,", insert --$x$,--;

line 65, delete "x", insert --$x$--.

Column 44, line 14, delete "m", insert --$m$--;

line 15, delete "eachoriginal", insert --each original--;

line 42, delete "providing", insert --producing--;

line 57, delete "i", insert --$i$--.

UNITED STATES PATENT AND TRADEMARK OFFICE
CERTIFICATE OF CORRECTION

PATENT NO. : 4,344,086

DATED : August 10, 1982

INVENTOR(S) : Shoji Mizuno

It is certified that error appears in the above—identified patent and that said Letters Patent is hereby corrected as shown below:

Column 45, line 4, delete "x", insert --$\underline{x}$--.

Signed and Sealed this

Second Day of November 1982

[SEAL]

Attest:

GERALD J. MOSSINGHOFF

*Attesting Officer*     *Commissioner of Patents and Trademarks*